US012257958B2

(12) United States Patent
Hakuta et al.

(10) Patent No.: US 12,257,958 B2
(45) Date of Patent: Mar. 25, 2025

(54) SILENCING MEMBER FOR ELECTRIFIED VEHICLE

(71) Applicant: FUJIFILM Corporation, Tokyo (JP)

(72) Inventors: Shinya Hakuta, Ashigara-kami-gun (JP); Takafumi Hosokawa, Ashigara-kami-gun (JP); Shogo Yamazoe, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 716 days.

(21) Appl. No.: 17/371,639

(22) Filed: Jul. 9, 2021

(65) Prior Publication Data

US 2021/0331630 A1 Oct. 28, 2021

Related U.S. Application Data

(63) Continuation of application No. PCT/JP2019/049456, filed on Dec. 17, 2019.

(30) Foreign Application Priority Data

Jan. 11, 2019 (JP) .................. 2019-003108

(51) Int. Cl.
B60R 13/08 (2006.01)
B62D 25/10 (2006.01)
G10K 11/172 (2006.01)

(52) U.S. Cl.
CPC ........ B60R 13/0838 (2013.01); G10K 11/172 (2013.01); B62D 25/10 (2013.01)

(58) Field of Classification Search
CPC ..... G10K 11/172; B60R 13/08; B60R 13/083; B60R 13/0838; B62D 25/10; B62D 25/105

(Continued)

(56) References Cited

U.S. PATENT DOCUMENTS 2,989,136 A * 6/1961 Wohlberg ............ G10K 11/172
  52/794.1
5,719,359 A * 2/1998 Wolf .................... G10K 11/172
  181/286

(Continued)

FOREIGN PATENT DOCUMENTS

CN 101515453 A 8/2009
CN 102317119 A 1/2012

(Continued)

OTHER PUBLICATIONS

Machine translation of JP5080877 (Year: 2012).*

(Continued)

Primary Examiner — Forrest M Phillips
Assistant Examiner — Jennifer B. Olson
(74) Attorney, Agent, or Firm — Birch, Stewart, Kolasch & Birch, LLP

(57) ABSTRACT

Provided is a silencing member for an electrified vehicle, which can suitably reduce a narrow band sound generated by a motor or the like, can handle a plurality of frequencies, can prevent generation of a wind noise, and can be miniaturized and thinned. The silencing member for an electrified vehicle includes a film type resonance structure which silences a sound generated from a sound source which is disposed in an electrified vehicle, in which the sound source generates a narrow band sound, the film type resonance structure is disposed in the same space as the sound source or in a vehicle cabin of the electrified vehicle, the film type resonance structure includes at least one film-like member, a frame which supports the film-like member to allow vibration thereof, and a back plate which is installed in the frame to face the film-like member, the film-like member, the frame, and the back plate form a back space surrounded by the film-like member, the frame, and the back plate, and the sound generated from the sound source is silenced by film (Continued)

vibration due to the film-like member of the film type resonance structure.

22 Claims, 19 Drawing Sheets

(58) Field of Classification Search
USPC .................................................. 181/200, 286
See application file for complete search history.

(56) References Cited

U.S. PATENT DOCUMENTS

| | | | |
|---|---|---|---|
| 8,382,184 B2 * | 2/2013 | Mizata | B60R 13/08 |
| | | | 296/39.3 |
| 2006/0152108 A1 | 7/2006 | Kodama et al. | |
| 2011/0056763 A1 | 3/2011 | Tanase et al. | |
| 2011/0272960 A1 | 11/2011 | Mizata et al. | |
| 2012/0201709 A1 | 8/2012 | Suzuki et al. | |
| 2016/0355148 A1 | 12/2016 | Ikeda | |
| 2018/0002919 A1 | 1/2018 | Yamazoe et al. | |
| 2018/0058066 A1 | 3/2018 | Yamazoe et al. | |
| 2019/0341016 A1 | 11/2019 | Hakuta et al. | |

FOREIGN PATENT DOCUMENTS

| | | | |
|---|---|---|---|
| JP | 2000-177643 A | 6/2000 | |
| JP | 2004-186118 A | 7/2004 | |
| JP | 2006-335098 A | 12/2006 | |
| JP | 2011-57000 A | 3/2011 | |
| JP | 5080877 B2 * | 11/2012 | ........... G10K 11/172 |
| JP | 2013-108488 A | 6/2013 | |
| JP | 2015-51710 A | 3/2015 | |
| JP | 2016-210282 A | 12/2016 | |
| WO | WO 2016/136959 A1 | 9/2016 | |
| WO | WO 2018/147129 A1 | 8/2018 | |

OTHER PUBLICATIONS

Japanese Office Action dated Jul. 5, 2022 for corresponding Application No. 2020-565659, with an English translation.
Extended European Search Report for corresponding European Application No. 19908736.2, dated Jan. 27, 2022.
International Preliminary Report on Patentability and Written Opinion of the International Searching Authority (Forms PCT/IB/373 and PCT/ISA/237) for International Application No. PCT/JP2019/049456, dated Jun. 16, 2021, with English translation of the Written Opinion.
International Search Report (Form PCT/ISA/210) for International Application No. PCT/JP2019/049456, dated Feb. 10, 2020, with English translation.
Chinese Office Action and Search Report dated Sep. 6, 2023 for corresponding Application No. 201980088665.3 with an English translation.
European Communication pursuant to Article 94(3) EPC for corresponding European Application No. 19908736.2, dated Aug. 29, 2022.

* cited by examiner

SILENCING MEMBER FOR ELECTRIFIED VEHICLE

CROSS-REFERENCE TO RELATED APPLICATIONS

This application is a Continuation of PCT International Application No. PCT/JP2019/049456 filed on Dec. 17, 2019, which claims priority under 35 U.S.C. § 119(a) to Japanese Patent Application No. 2019-003108 filed on Jan. 11, 2019. The above application is hereby expressly incorporated by reference, in its entirety, into the present application.

BACKGROUND OF THE INVENTION

1. Field of the Invention

The present invention relates to a silencing member for an electrified vehicle.

2. Description of the Related Art

In vehicles, an electrified vehicle, such as a hybrid vehicle, an electric vehicle, and a fuel cell vehicle, which use a motor in addition to or instead of an engine as a power source is being used.

In the vehicle using an engine (gasoline engine or diesel engine), a sound of a low frequency in the vicinity of 200 Hz caused by an engine sound is dominant as a noise. On the other hand, in the electrified vehicle, since the masking due to the engine sound of the low frequency is eliminated, there is a feature that the sound on a high frequency side can be likely to be heard.

In addition, the electrified vehicle to be driven by electricity is equipped with a motor, an inverter, and a converter. These components are known to generate a narrow band and strong sound in a high frequency region of several kHz depending on the rotation speed and/or the carrier frequency. In addition, a gear sound and a sound of an electric system such as a wire harness generate a narrow band sound of a specific frequency in many cases, and in the electrified vehicle, these sounds are also likely to be heard because masking due to engine sounds is eliminated.

It is also known that narrow band noise is generated from a fan used for air conditioner or component cooling depending on the number of blades and the rotation speed. Since the masking effect due to the engine sound is eliminated, this sound also becomes likely to be heard.

In the vehicle in the related art, as a noise countermeasure against the engine sound, sound absorption by using a porous material (porous sound absorbing body) such as a felt and Thinsulate is performed. In a case in which the sound is absorbed by using the porous material, assuming that the wavelength of the sound at the frequency to be absorbed is λ, the thickness of the porous material needs to be a thickness of λ/4 or more in order to absorb the sound efficiently. Further, in the sound absorption by using the porous material, the sound can be absorbed in a wide band, but it is difficult to strongly absorb the sound at a specific frequency. Therefore, in a case in which the porous material is used to silence the narrow band sound having the specific frequency, such as the motor described above, the sound is absorbed as a whole in the wide frequency band, and there is a problem that the peak sound of the specific frequency remains. In order to absorb this peak sound by using the porous material, it is necessary to make the material thicker, which is inefficient.

Here, a Helmholtz resonator is used as a unit for silencing a sound of a specific frequency in the vehicle.

For example, JP2015-051710A discloses a hood for a vehicle which opens and closes an engine compartment, the hood comprising a honeycomb unit in which at least a part of a hood main body is configured by a resin honeycomb structure and the honeycomb structure are divided from each other by a partition wall and includes a number of tubular cells, an inner sealing plate unit which is disposed near an engine of the honeycomb unit, and an outer sealing plate unit which is disposed far from the engine of the honeycomb unit and seals each cell by interposing the honeycomb unit with the inner sealing plate unit, in which a through hole which extends in a thickness direction to communicates a space on the engine side from the inner sealing plate unit and an internal space of the cell is formed in the inner sealing plate unit, and a distance between the inner sealing plate unit and the outer sealing plate unit is set to be larger in a portion facing the engine than in a portion facing the peripheral portions of the engine. In JP2015-051710A, it is disclosed that each cell of the honeycomb structure configures the Helmholtz resonator to silence the sound generated in the engine compartment.

JP2000-177643A discloses an engine compartment in which a resonance type sound absorber is disposed in the center portion in the horizontal direction of the engine compartment and the right and left ends of the engine compartment to face the center portion in the left-right direction in which the antinode of the standing wave noise is located and match the resonance frequency of the sound absorption with the frequency of the standing wave noise, in order to reduce the standing wave noise in two-node mode with antinodes in acoustic mode. Also, JP2000-177643A discloses a Helmholtz type resonance type resonator as a resonance type sound absorber.

JP2004-186118A discloses an air supply device for a fuel cell including an air supply machine that takes in air and supplies the air to the fuel cell, an electric motor that drives the air supply machine, a filter that is disposed on an intake side of the air supply machine, and a silencer that is disposed immediately behind a discharge side of the air supply machine. In JP2004-186118A, it is disclosed that the air supply device for a fuel cell is used in a fuel cell vehicle. Also, JP2004-186118A discloses a Helmholtz type resonator as a silencer.

JP2013-108488A discloses a compressor comprising a compression mechanism that compresses a sucked fluid and discharges the fluid, and a housing that includes a silencing cooler which cools the discharged fluid and alleviates pressure changes, in which the housing includes a cylinder block integrally formed so as to comprise a compression space in which the compression mechanism is accommodated, a silencing cooling space in which the silencing cooler is accommodated, and a communication hole that communicates the compression space with the silencing cooling space. JP2013-108488A discloses that the compressor is used in an electric vehicle using a fuel cell. Also, in JP2013-108488A, it is disclosed that a silencer reduces the noise of the discharge pulsation of the compressor, and that the silencer silences the sound by Helmholtz resonance.

SUMMARY OF THE INVENTION

As described above, in the electrified vehicle to be driven by electricity, masking due to the engine sound of the low frequency is eliminated, so that the narrow band sound of the specific frequency generated from the motor, the inverter, the converter, and the like can be likely to be heard. Therefore, as in the related art, sound absorption by using the porous material such as the felt and the Thinsulate causes a problem that a peak sound of a specific frequency remains.

However, in the related art, in the electrified vehicle, it has not been considered to suppress the narrow band sound of the specific frequency generated from the motor, the inverter, the converter, and the like which drives the electrified vehicle.

On the other hand, it is conceivable to use the Helmholtz resonator as disclosed in JP2015-051710A, JP2000-177643A, JP2004-186118A, and JP2013-108488A to reduce the narrow band sound of the specific frequency generated from the motor, the inverter, the converter, and the like. However, according to the study of the present inventors, the silencing by the Helmholtz resonator generates only one narrow band sound absorption peak which corresponds to one resonance frequency. Therefore, it has been seen that there is a problem that it cannot handle a plurality of frequencies. Further, the Helmholtz resonator needs to have a thick through hole on the surface due to its resonance mechanism. Therefore, a thick plate is needed in addition to the back space. For this reason, there is a problem that the through hole becomes thicker than the back space.

Further, in the electrified vehicle, wind is generated in a space (motor compartment) in which the motor or the like is installed in accordance with the movement of the electrified vehicle. It has been seen that in a case in which the Helmholtz resonator is installed in the space in which the motor or the like is installed to silence the motor sound or the like, the Helmholtz resonator has an opening portion, so that there is a problem that a wind noise is likely to be generated.

An object of the present invention is to solve the problems in the related art, and to provide a silencing member for an electrified vehicle, which can suitably reduce a narrow band sound generated by a motor or the like, can handle a plurality of frequencies, can prevent generation of a wind noise, and can be miniaturized and thinned.

In order to solve this problem, the present invention has the configuration as follows.

[1] A silencing member for an electrified vehicle, the member comprising a film type resonance structure which silences a sound generated from a sound source which is disposed in an electrified vehicle, in which the sound source generates a narrow band sound, the film type resonance structure is disposed in the same space as the sound source or in a vehicle cabin of the electrified vehicle, the film type resonance structure includes at least one film-like member, a frame which supports the film-like member to allow vibration thereof, and a back plate which is installed in the frame to face the film-like member, the film-like member, the frame, and the back plate form a back space surrounded by the film-like member, the frame, and the back plate, and the sound generated from the sound source is silenced by film vibration due to the film-like member of the film type resonance structure.

[2] The silencing member for an electrified vehicle according to [1], in which the film type resonance structure is disposed in the same space as the sound source.

[3] The silencing member for an electrified vehicle according to [1] or [2], in which the sound source is at least one of an electrified vehicle motor, an inverter and a converter for the electrified vehicle motor, or an inverter and a converter for an electrified vehicle battery that supplies an electric power to the electrified vehicle motor.

[4] The silencing member for an electrified vehicle according to [3], in which the electrified vehicle includes a motor compartment which forms a space in which the electrified vehicle motor is disposed, and the film type resonance structure is disposed in the motor compartment.

[5] The silencing member for an electrified vehicle according to any one of [1] to [4], in which a sound absorption coefficient of film vibration of the film-like member at a frequency in at least one high-order vibration mode is higher than a sound absorption coefficient at a frequency in a fundamental vibration mode.

[6] The silencing member for an electrified vehicle according to any one of [1] to [5], in which a through hole is formed in at least one of the film-like member or the frame.

[7] The silencing member for an electrified vehicle according to any one of [1] to [6], in which in a case in which a wavelength of a peak frequency of the narrow band sound generated by the sound source is $\lambda$, a thickness of the back space is $\lambda/6$ or less in a direction perpendicular to a surface of the film-like member.

[8] The silencing member for an electrified vehicle according to any one of [1] to [7], in which a peak frequency of the narrow band sound generated by the sound source is 1000 Hz or more.

[9] The silencing member for an electrified vehicle according to any one of [1] to [8], further comprising a porous sound absorbing body which is attached to the film type resonance structure.

[10] The silencing member for an electrified vehicle according to any one of [1] to [9], in which the film type resonance structure is attached to a hood of the electrified vehicle.

[11] The silencing member for an electrified vehicle according to any one of [3] to [9], in which the film type resonance structure is attached to at least one of a cover of the electrified vehicle motor of the electrified vehicle or a cover of the inverter for the electrified vehicle motor.

[12] The silencing member for an electrified vehicle according to any one of [1] to [11], in which at least one of the frame or the back plate is integrally formed with a component of the electrified vehicle.

[13] The silencing member for an electrified vehicle according to [12], in which the back plate is a hood of the electrified vehicle.

[14] The silencing member for an electrified vehicle according to [12] or [13], in which the frame is integrally formed with the hood of the electrified vehicle.

[15] The silencing member for an electrified vehicle according to any one of [1] to [14], in which an average thickness of the film type resonance structure is 10 mm or less.

According to the present invention, it is possible to provide a silencing member for an electrified vehicle, which can suitably reduce a narrow band sound generated by a motor or the like, can handle a plurality of frequencies, can prevent generation of a wind noise, and can be miniaturized and thinned.

DESCRIPTION OF THE PREFERRED EMBODIMENTS

Figure 1:
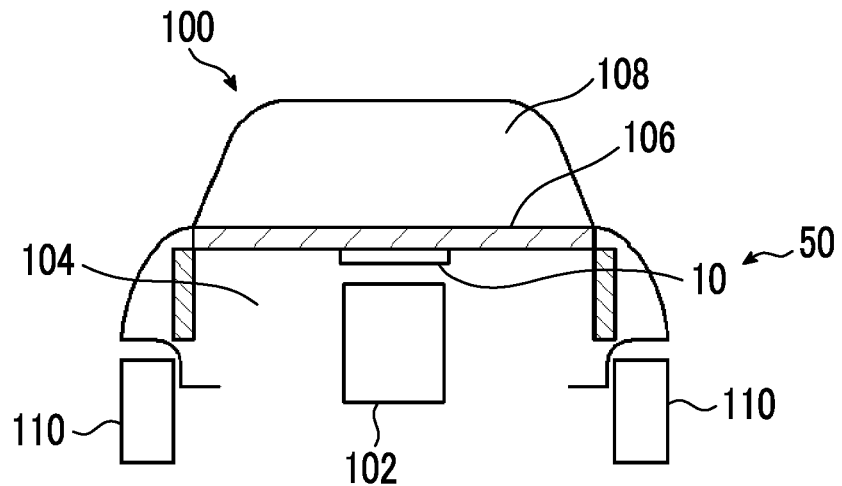
FIG. 1 is a cross-sectional view schematically showing an example of an electrified vehicle having an example of a silencing member for an electrified vehicle according to an embodiment of the present invention.

The present invention will be described below in detail.

The description of the configuration elements described below may be based on the typical embodiment of the present invention, but the present invention is not limited to such an embodiment.

Note that, in the present specification, the numerical range represented by "to" means a range including numerical values denoted before and after "to" as a lower limit value and an upper limit value.

Further, in the present specification, for example, an angle such as "45°", "parallel", "perpendicular" or "orthogonal" is within a range in which the difference from the exact angle is less than 5 degrees unless otherwise noted. The difference from the exact angle is preferably less than 4 degrees, and more preferably less than 3 degrees.

In the present specification, "the same" includes an error range generally accepted in the technical field. Further, in the present specification, in a case in which the term "every", "all" or "entirely" is used, it includes, in addition to a case of 100%, the error range generally accepted in the technical field for example, a case of being 99% or more, 95% or more, or 90% or more.

[Film Type Resonance Structure]

A silencing member for an electrified vehicle according to an embodiment of the present invention is the silencing member comprising a film type resonance structure which silences a sound generated from a sound source which is disposed in an electrified vehicle, in which the sound source generates a narrow band sound, the film type resonance structure is disposed in the same space as the sound source or in a vehicle cabin of the electrified vehicle, the film type resonance structure includes at least one film-like member, a frame which supports the film-like member to allow vibration thereof, and a back plate which is installed in the frame to face the film-like member, the film-like member, the frame, and the back plate form a back space surrounded by the film-like member, the frame, and the back plate, and a resonance frequency of film vibration due to the film-like member of the film type resonance structure is a frequency corresponding to a frequency of the sound generated from the sound source.

The silencing member for the electrified vehicle according to the embodiment of the present invention is the silencing member used in the electrified vehicle.

The electrified vehicle is a vehicle which has a motor (hereinafter, referred to as an electrified vehicle motor) as a power source, and is a so-called hybrid vehicle which has an engine (gasoline engine or diesel engine) and an electrified vehicle motor as the power source, and an electric vehicle which has an electrified vehicle motor as the power source. Basically, the electrified vehicle has a battery (hereinafter, referred to as an electrified vehicle battery) which stores an electric power to be supplied to the electrified vehicle motor. Further, as the form of supplying the electric power to the battery, the electric power may be supplied to the battery directly from the outside (so-called electric vehicle), the electric power may be supplied to the battery by driving a power generator by a built-in engine, or the electric power may be supplied to the battery by power generation by a built-in fuel cell. Also, the electric power generated by the fuel cell without the battery may be supplied directly to the electrified vehicle motor to drive the electrified vehicle motor (so-called fuel cell vehicle).

Also, as the electrified vehicle which includes the engine and the electrified vehicle motor, the engine and the electrified vehicle motor may be used as the power source at the same time or by switching, or the engine may be used to generate power and driving may be performed by only the electrified vehicle motor.

In such an electrified vehicle, examples of the sound source which generates the narrow band sound include the following.
- electrified vehicle motor which is used as a power source
- inverter which is a circuit that converts the electric power supplied to the electrified vehicle motor from a direct current to an alternating current, or to an alternating current having different frequencies, and/or converter which is a circuit that converts the electric power from the alternating current to the direct current
- inverter and/or converter which converts the electric power supplied to the electrified vehicle battery that supplies the electric power to the electrified vehicle motor, and/or the electric power output from the electrified vehicle battery
- gear that decelerates and/or accelerates and transmits the power (rotation) to tires, which is transmitted from the electrified vehicle motor to the tires
- wire harness which is an electric wire for sharing the electric power from the electrified vehicle battery to the electrified vehicle motor
- fan which is used in the electrified vehicle, in particular, a peak noise decided by the rotation speed and the number of blades The narrow band sound generated by these sound sources has a peak frequency of 1000 Hz or more, more often 1.5 kHz to 12 kHz, and even more often 2 kHz to 10 kHz.

The narrow band sound generated by rotation, such as the noise of the motor, is often a sound source of a plurality of narrow band sounds because a plurality of higher-order sounds are generated with respect to the rotation speed.

In the following description, the electrified vehicle motor is also simply referred to as a motor. The electrified vehicle battery is also simply called a battery. The inverter for the electrified vehicle motor and the inverter for the electrified vehicle battery are also collectively referred to as inverter. Further, the converter for the electrified vehicle motor and the converter for the electrified vehicle battery are also collectively referred to as converter.

In a case in which the sound source is an electronic component such as the inverter, a sound (switching noise) which corresponds to the carrier frequency is generated.

In a case in which the sound source is the motor, a sound (electromagnetic noise) having a frequency, which corresponds to the rotation speed is generated. In this case, the frequency of the generated sound is not necessarily limited to the rotation speed or a multiple thereof, but there is a strong relationship that the sound becomes higher as the rotation speed is increased.

That is, each of the sound sources generates a sound of a natural frequency of the sound source.

Here, in the present invention, the narrow band sound (hereinafter, also referred to as a narrow band sound) is a sound of a frequency in which a sound pressure is a maximum value that is 3 dB or more larger than the sound of the frequency around the outside of the narrow band peak. The outside of the narrow band peak is a region in which a narrow band sound component is buried in sounds other than the narrow band sound (sounds of other factors such as a background noise and a wind noise).

Tone to Noise Ratio (TNR) is defined in ECMA-74 or ISO 7779, as an index. Based on this, a volume difference between the peak sound and the peripheral frequency sound need only be evaluated. In a case in which there is a difference of 3 dB or more, it is treated as the narrow band sound.

In a case in which the narrow band sounds are dense on the frequency axis and difficult to evaluate by using the above method, the narrow band sounds can be compared with the peripheral sounds by using the Prominence ratio defined in ECMA-74 or ISO 7779 in the same manner. Even in such a case, in a case in which the difference is 3 dB or more, it need only be treated as the narrow band sound.

Whether or not the sound source generates a natural narrow band sound can be specified by, for example, carrying out the following experiment.

In a case in which the sound source can generate the sound by itself, the sound source is disposed in an anechoic chamber, a semi-anechoic chamber, or a state surrounded by a sound absorbing body such as urethane. By surrounding by the sound absorbing body, the influence of reflection interference in the room and the measurement system is eliminated. Thereafter, the sound source is sounded, measurement is performed with a microphone from a distant position, and the relationship (frequency characteristic) between the sound pressure and the frequency is acquired. The distance to the microphone can be appropriately selected depending on the size of the sound source and the measurement system, but it is desirable to perform measurement at a distance of about 30 cm or more.

In a case in which the sound is generated only by moving the electrified vehicle, it is desirable to perform evaluation by attaching the microphone to the position of the driver's ear in the vehicle cabin.

In the frequency characteristic of the sound source, the frequency at which the sound pressure is the maximum value (peak) is called the peak frequency. In a case in which the maximum value is 3 dB or more larger than the sound at the peripheral frequency, the peak frequency sound can be sufficiently recognized by a human, and thus it can be said to be the sound source that generates the narrow band sound. In a case in which the maximum value is 5 dB or more, it can be more recognized, and in a case in which the maximum value is 10 dB or more, it can be further recognized. Evaluation can be performed by using the TNR or the Prominence Ratio as described above.

In the electrified vehicle, there is a problem that the narrow band sound generated from the above sound source is heard in the vehicle cabin.

For example, the journal of the Japan Society of Mechanical Engineers 2007. 7 Vol. 110 No. 1064, "Vibration noise phenomenon of hybrid vehicles and its reduction technology" describes a motor electromagnetic noise and a switching noise, and causes thereof and typical noise frequencies are disclosed. According to the comparison table described, it is disclosed that the motor electromagnetic noise of several hundred Hz to several kHz and the switching noise of several kHz to ten-odd kHz are noises on the higher frequency side than the frequencies of other noises.

In addition, for example, in P. 30 of the manual of Prius (2015) manufactured by Toyota motor corporation, "about sound and vibration peculiar to hybrid vehicles", "operating sound of electric motor from engine compartment ("keening" sound in a case of acceleration, "buzzing" sound in a case of deceleration)" is disclosed.

In addition, EV-9 of the manual of LEAF (2011) manufactured by Nissan Motor Corporation, which is an electric vehicle, discloses "sound of motor generated from motor compartment" as "about sound and vibration".

In this way, as the vehicle become hybrid vehicles and electric vehicles, the narrow band sound of the specific frequency on the high frequency side, which is not present in the related art, is generated at a loudness that can be heard even in the vehicle cabin.

The silencing member for the electrified vehicle according to the embodiment of the present invention silences the sound generated from the sound source which generates the narrow band sound, which is disposed in the electrified vehicle as described above.

Hereinafter, an example of the silencing member for the electrified vehicle according to the embodiment of the present invention will be described with reference to FIGS. 1 to 5.

Figure 2:
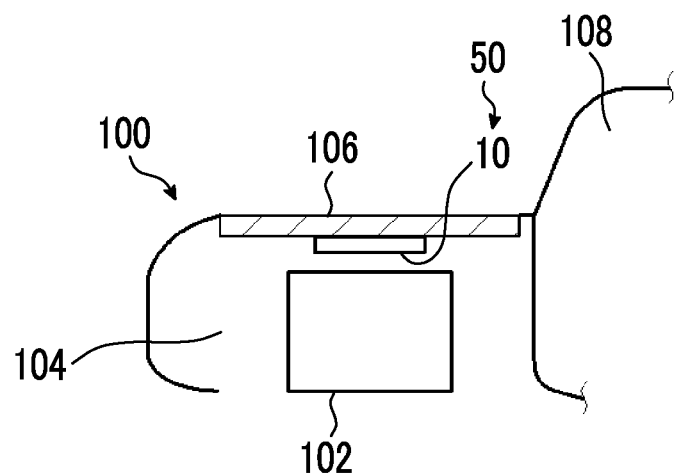
FIG. 2 is a cross-sectional view of the electrified vehicle of FIG. 1 as viewed from a side surface.
Figure 3:
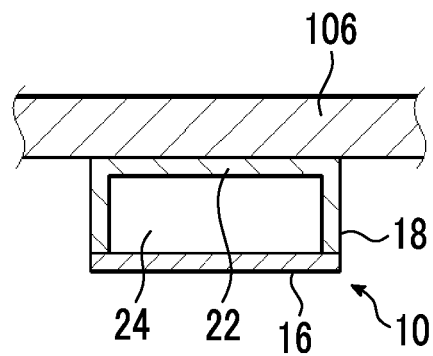
FIG. 3 is an enlarged schematic cross-sectional view showing a film type resonance structure included in the silencing member for the electrified vehicle shown in FIG. 1.
Figure 4:
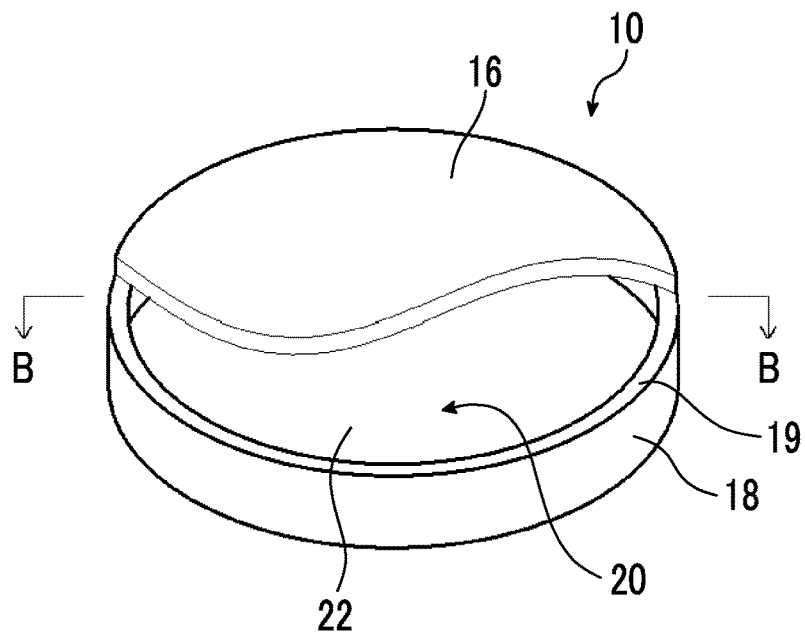
FIG. 4 is a schematic perspective view of the film type resonance structure.
Figure 5:
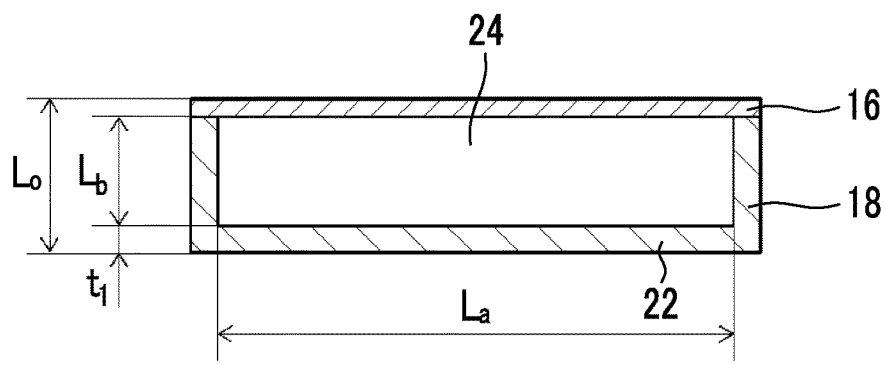
FIG. 5 is a cross-sectional view taken along a line B-B of the film type resonance structure shown in FIG. 4.

FIG. 1 is a schematic cross-sectional view showing a part of the electrified vehicle having an example of the silencing member for the electrified vehicle according to the embodiment of the present invention. FIG. 2 is a side sectional view of the electrified vehicle shown in FIG. 1. FIG. 3 is an enlarged schematic cross-sectional view showing a film type resonance structure included in the silencing member for the electrified vehicle shown in FIG. 1. FIG. 4 is a schematic perspective view of the film type resonance structure. FIG. 5 is a cross-sectional view taken along a line B-B of the film type resonance structure shown in FIG. 4. Further, in FIGS. 1 and 2, a part of the electrified vehicle (component included in the electrified vehicle) is omitted for the sake of explanation. Further, in FIG. 4, a part of the film-like member 16 is omitted for the sake of explanation.

As shown in FIGS. 1 and 2, an electrified vehicle 100 includes an electrified vehicle motor 102, a motor compartment 104, a hood 106, a vehicle cabin 108, and a tire 110. Although a part of the electrified vehicle is omitted in FIGS. 1 and 2, it has various devices which configure a known electrified vehicle.

The electrified vehicle motor 102 is a motor for driving the electrified vehicle 100. That is, the electrified vehicle motor 102 is connected to the tire 110 via a gear, a propeller shaft (not shown), or the like, and the power (rotational force) generated by driving the electrified vehicle motor 102 is transmitted to the tire 110 via the gear, the propeller shaft (not shown), or the like, and the tire 110 is rotated to drive the electrified vehicle 110. The electrified vehicle motor 102 is directly or indirectly supported by a front side member (not shown).

The electrified vehicle motor 102 is various known motors used in the electrified vehicle.

As described above, in the present invention, the electrified vehicle motor 102 is the sound source which generates the narrow band sound.

The motor compartment 104 is for forming a space in which the electrified vehicle motor 102 is installed. That is, the motor compartment 104 is a so-called engine compartment in the engine vehicle. In the examples shown in FIGS. 1 and 2, the motor compartment 104 is disposed on the front side of the vehicle cabin 108 (the space in which the user gets). The motor compartment 104 may be disposed on the rear side of the vehicle cabin.

Further, in the motor compartment 104, various devices included in the electrified vehicle, such as the inverter and the converter for the electrified vehicle motor, the electrified vehicle battery which supplies the electric power to the electrified vehicle motor, and the inverter and the converter for the electrified vehicle battery, may be disposed in addition to the electrified vehicle motor 102.

Further, in the case in which the electrified vehicle has a configuration in which the engine is provided, such as the hybrid vehicle, the engine and various devices necessary for the operation of the engine may be disposed in the motor compartment 104.

The hood 106 is a substantially plate-shaped member disposed to be able to open and close the upper portion of the motor compartment 104.

The hood 106 may have various configurations used in known electrified vehicles. For example, a hinge for opening and closing the upper portion of the motor compartment 104, a lock mechanism for holding the hood 106 on a vehicle body in a case in which the motor compartment 104 is closed, and the like are provided.

Further, in the examples shown in FIGS. 1 and 2, a silencing member 50 for the electrified vehicle including a film type resonance structure 10 is attached to the surface of the hood 106 on the electrified vehicle motor 102 side.

The film type resonance structure 10 silences the sound generated by the sound source.

In the examples shown in FIGS. 1 and 2, the sound source is the electrified vehicle motor 102, and the film type resonance structure 10 silences the narrow band sound generated by the electrified vehicle motor 102.

In the examples shown in FIGS. 1 and 2, the film type resonance structure 10 is disposed in the motor compartment 104, that is, in the same space as the sound source.

As shown in FIGS. 3 to 5, the film type resonance structure 10 includes a frame 18 which has an opening portion 20, a film-like member 16 (also simply referred to as a "film") which is fixed to an opening surface 19 of the frame 18, and a back plate 22 which is fixed to the other opening surface of the frame 18 to face the film-like member 16. In the examples shown in FIGS. 3 to 5, the frame 18 and the back plate 22 are integrally formed.

The frame 18 is a tubular member which has the opening portion 20 that penetrates, and the film-like member 16 is disposed on one opening surface 19 and the back plate 22 is disposed on the other opening surface.

In the examples shown in FIGS. 3 to 5, the frame 18 and the back plate 22 are integrally formed, and the opening portion 20 which has a cylindrical shape and has a bottom surface on one surface is formed. That is, the member in which the frame 18 and the back plate 22 are integrated has a bottomed cylindrical shape with one open surface.

The film-like member 16 is a member which is film-like, and covers the opening surface 19 of the frame 18 in which the opening portion 20 is formed, and the peripheral portion thereof is fixed to the frame 18 and is supported to allow vibration thereof.

Further, the film-like member 16, the frame 18, and the back plate 22 form a back space 24 surrounded by the film-like member 16, the frame 18, and the back plate 22. In the examples shown in FIGS. 3 to 5, the back space 24 is a closed space which is closed.

The film type resonance structure 10 exhibits a sound absorbing function by using the film vibration of the film-like member 16 which has the back space 24 on the back side, and selectively silences the sound of the specific frequency (frequency band).

Therefore, in the film type resonance structure 10, the resonance frequency of the film vibration of the film-like member 16 is set depending on the frequency of the sound generated from the sound source. For example, in a case in which the sound source generates the narrow band sound at the specific frequency, such as the inverter and the converter, the resonance frequency of the film vibration need only be set in accordance with the peak frequency of the sound.

On the other hand, in a case in which the peak frequency is changed depending on the operating state, as in the electrified vehicle motor, for example, in a case in which the speed limit is decided by traffic regulations, the resonance frequency of the film vibration can be set in accordance with the rotation speed of the electrified vehicle motor at the speed. For example, since the speed limit on the general road in Japan is about 60 km/h, and the speed limit on the expressway is about 100 km/h, the resonance frequency of the film vibration need only be set in accordance with the rotation speed of the electrified vehicle motor in a case in which the electrified vehicle travels at this speed.

Alternatively, in a case in which the frequency of the sound generated by the electrified vehicle motor and the frequency of the sound generated by the inverter and/or the converter are close to each other, the sound of the frequency becomes louder. Therefore, it is also preferable to set the resonance frequency of the film vibration to this frequency.

Alternatively, at the resonance frequency of a housing of the electrified vehicle motor, the resonance frequency of the motor cover, and the like, the sound generated by the electrified vehicle motor is likely to be radiated to the outside due to these resonances. Therefore, the resonance frequency of the film vibration may be set in accordance with the frequency at which the sound generated by the electrified vehicle motor is likely to be radiated to the outside.

In this way, the resonance frequency of the film vibration may be set depending on the electrified vehicle motor and the surrounding environment.

As described above, the electrified vehicle to be driven by electricity is equipped with a motor, an inverter, and a converter. These components generate the narrow band and strong sound in the high frequency region of several kHz depending on the rotation speed and/or the carrier frequency. In addition, a gear sound and a sound of the electric system such as the wire harnesses generate the narrow band sound of the specific frequency in many cases. In addition, the fan used for the air conditioner and component cooling also generate a large narrow band noise depending on the number of blades and the rotation speed. In the electrified vehicle, masking due to engine sound is eliminated, so that these sounds are likely to be heard.

There is a problem that it is difficult to absorb such a narrow band sound of the specific frequency with the sound absorption by the porous sound absorbing body such as felt and the Thinsulate used in the vehicle in the related art.

It is conceivable to reduce the narrow band sound of the specific frequency by using a Helmholtz resonator, but according to the study by the present inventors, in a case of silencing by the Helmholtz resonator, only one narrow band absorption peak is generated, which corresponds to one resonance frequency, and thus there is a problem that it cannot handle a plurality of the frequencies, and a case in which the peak frequency of the sound is changed depending on the operating state of the motor or the like cannot be handled.

Further, in the electrified vehicle, wind is generated in a space (motor compartment) in which the motor or the like is installed in accordance with the movement of the electrified vehicle. It has been seen that in a case in which the Helmholtz resonator is installed in the space in which the motor or the like is installed to silence the motor sound or the like, the Helmholtz resonator has an opening portion, so that there is a problem that a wind noise is likely to be generated.

Further, since the Helmholtz resonator has a surface plate other than the back space, the overall thickness becomes large, so that it cannot be sufficiently miniaturized and thinned.

On the other hand, the silencing member for the electrified vehicle according to the embodiment of the present invention uses the film type resonance structure that selectively silences the sound in the specific frequency band by using the film vibration, and silences the narrow band sound of the specific frequency.

In the film vibration in the film type resonance structure 10, in addition to the resonance at the frequency in the fundamental vibration mode, the resonance at the frequency in the high-order vibration mode, that is, the higher-order natural frequency such as the second and third natural frequency occurs. Therefore, the film type resonance structure 10 can silence the sound at the frequency in the high-order vibration mode in addition to the frequency in the fundamental vibration mode. As a result, it is possible to handle a plurality of the frequencies.

Further, for example, by designing the film type resonance structure 10 such that the second natural frequency and the third natural frequency are close to each other, the silencing effect due to the sound absorption can be obtained in the frequency band between the second natural frequency and the third natural frequency, and thus even in a case in which the peak frequency of the sound is changed depending on the operating state of the motor or the like, the film type resonance structure 10 can sufficiently silence the sound.

Further, since the film type resonance structure 10 can have a closed configuration without the opening, even in a case in which wind is generated in the space (motor compartment) in which the motor or the like is installed in accordance with the movement of the electrified vehicle, the wind noise is prevented from being generated.

Further, since the film type resonance structure 10 silences the sound by the vibration of the thin film-like member 16, it can be miniaturized and thinned as compared with the porous sound absorbing body or the silencing member using the Helmholtz resonator.

Here, in the example shown in FIG. 1, a configuration is adopted in which the film type resonance structure 10 is disposed in the motor compartment 104, but the present invention is not limited to this, and the film type resonance structure 10 may be disposed in the vehicle cabin 108. It is preferable that the film type resonance structure 10 be disposed in the same space as the sound source from the point of obtaining a higher silencing effect. By disposing the film type resonance structure 10 in the same space as the sound source, in a case in which the target narrow band sound resonates in the space, the film type resonance structure acts on the sounds that comes and goes many times due to resonance in the space. In this case, a particularly high silencing effect can be obtained as compared with the case in which only one sound absorbing action of the film type resonance structure is performed. In particular, a higher silencing effect can be obtained by disposing the film type resonance structure at the portion which is an antinode of the sound pressure due to the resonance in the space. For example, such conditions can be satisfied at the corner of this space.

Further, even in a case in which the target narrow band sound does not cause a strong resonance phenomenon in the space, sound density is generated in the space. Even in that case, by disposing the film type resonator at the position which is the antinode of the sound pressure, the silencing effect can be increased as compared with the case in which a film type resonator is disposed in the free space or another space.

Further, as shown in FIGS. 1 to 3, it is preferable that the film type resonance structure 10 be disposed such that the film-like member 16 side faces the sound source from the point of obtaining a higher silencing effect.

Further, in the examples shown in FIGS. 1 to 3, a configuration is adopted in which the film type resonance structure 10 is disposed on the surface of the hood 106 on the electrified vehicle motor 102 (sound source) side, but the present invention is not limited to this. For example, in a case in which the motor cover that covers the electrified vehicle motor is provided, the film type resonance structure 10 may be disposed on the motor cover. Further, the film type resonance structure 10 can be disposed inside the motor cover (between the motor housing and the motor cover).

Further, since the inverter and the converter are basically disposed in the motor compartment 104, it is preferable that the film type resonance structure 10 be disposed in the hood 106 even in a case in which the sound source is the inverter or the converter.

Figure 6:
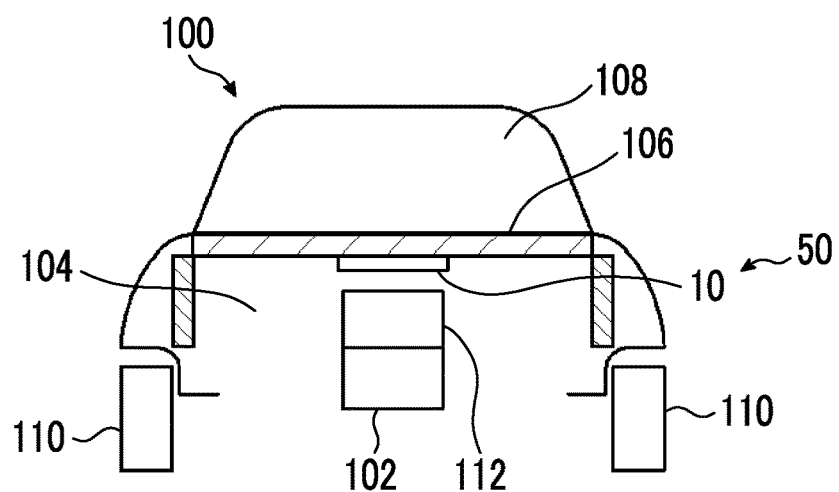
FIG. 6 is a cross-sectional view schematically showing an example of an electrified vehicle having another example of a silencing member for an electrified vehicle according to an embodiment of the present invention.

For example, as in the example shown in FIG. 6, the inverter 112 may be integrally disposed with the electrified vehicle motor 102. Even in a case in which the inverter 112 is integrally disposed with the electrified vehicle motor 102, it is preferable that the film type resonance structure 10 be disposed on the hood 106.

Further, in a case in which the inverter and the converter are covered with the motor cover together with the electrified vehicle motor, the film type resonance structure 10 may be disposed on the motor cover. In addition, in a case in which the inverter and/or the converter is disposed independently of the electrified vehicle motor and the inverter cover or the converter cover is provided independently of the inverter and/or the converter, the film type resonance structure may be disposed on the cover thereof. Further, the film type resonance structure may be disposed inside the cover (the space between the inverter and/or the converter and the cover). Further, it is preferable that the film surface of the film type resonance structure be disposed to face the inverter and/or the converter. As a result, the inverter and/or converter, which is the sound source, can be disposed such that the film type resonance structure surrounds the inverter and/or converter at a short distance, so that the silencing effect can be further improved.

Further, for example, in a case in which the electrified vehicle motor 102 and the inverter 112 are used as sound sources and the generated sounds are silenced, two or more film type resonance structures 10 that can silence the sounds of the frequencies, which correspond to each of the electrified vehicle motor 102 and the inverter 112, need only be disposed. That is, in a case in which the electrified vehicle has a plurality of sound sources, two or more film type resonance structures 10 that can silence the sound depending on the frequency of the sound generated by each sound source need only be disposed in the same space as each sound source or in the vehicle cabin of the electrified vehicle.

Alternatively, for example, in a case in which the electrified vehicle motor 102 and the inverter 112 are the sound source, as described above, in a case in which the frequency of the sound generated by the electrified vehicle motor and the frequency of the sound generated by the inverter are close to each other, the sound of the frequency becomes louder. Therefore, a configuration may be adopted in which one film type resonance structure that can silence the sound of the frequency generated by the inverter is disposed.

In a case in which the sound source is the gear or the wire harness, it is preferably disposed in the vicinity of the gear or the wire harness.

It is a unit peculiar to the electrified vehicle and the unit generates a particularly loud narrow band sound among the units of the electrified vehicle, the unit is disposed in the space such as the motor compartment in many cases, the cover is mounted on the unit in many cases, and the film type resonance structure is easily disposed, and thus the silencing member for the electrified vehicle according to the embodiment of the present invention can be suitably applied by the electrified vehicle motor, the inverter and the converter for the electrified vehicle motor, and the inverter and the converter for the electrified vehicle battery.

Further, at least one of the frame 18 or the back plate 22 of the film type resonance structure 10 may be integrally formed with the component of the electrified vehicle.

Figure 7:
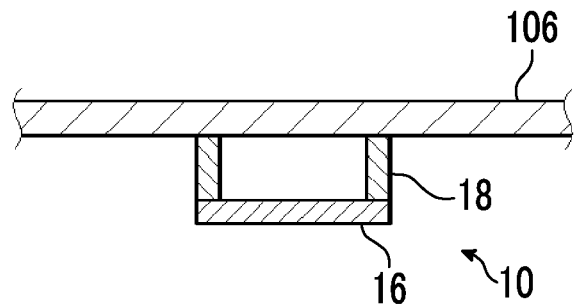
FIG. 7 is a schematic cross-sectional view showing another example of the film type resonance structure.
Figure 8:
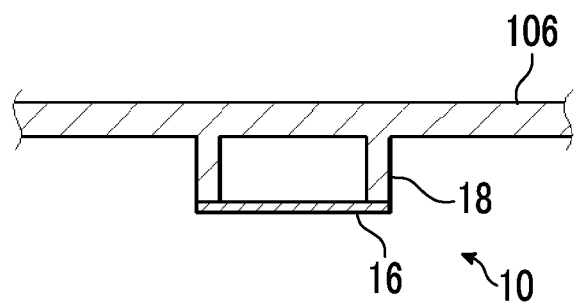
FIG. 8 is a schematic cross-sectional view showing a still another example of the film type resonance structure.

For example, in the example shown in FIG. 3, the film type resonance structure 10 is configured to be attached to the hood 104 as a separate body, but as shown in FIG. 7, a configuration may be adopted in which the back plate is integrated with the hood 106, that is, the hood 106 is used as the back plate. Alternatively, as shown in FIG. 8, the frame 18 may be integrally formed with the hood 106.

Here, in the present invention, in the film type resonance structure 10, it is preferable that a sound absorption coefficient of film vibration of the film-like member 16 which is supported by the frame 18 at a frequency in at least one high-order vibration mode be higher than a sound absorption coefficient at a frequency in a fundamental vibration mode.

As described above, the sound source of the electrified vehicle motor or the like generates the narrow band sound of a high frequency of 1000 Hz or more.

In a case in which such a sound of the high frequency is silenced by the silencing unit which uses the film vibration, it is conceivable to increase the natural frequency of the film vibration by adjusting the hardness of the film, the size of the film, and the like.

However, according to the study by the present inventors, in a case in which the natural frequency in the fundamental mode of the film vibration is increased by adjusting the hardness of the film, the size of the film, and the like in the silencing unit which uses the film vibration, it has been seen that the sound absorption coefficient is decreased at high frequencies.

Specifically, in order to absorb the sound of the high frequency by using the film vibration in the fundamental vibration mode, it is necessary to make the film harder and thicker to increase the frequency (first natural frequency) in the fundamental vibration mode. However, according to the study by the present inventors, in a case in which the film is made too hard and thick, the sound is likely to be reflected by the film. Therefore, the sound absorption (sound absorption coefficient) due to the film vibration is decreased as the frequency in the fundamental vibration mode is increased.

The force that interacts with the film vibration is decreased as the frequency of the sound is higher. On the other hand, it is necessary to harden the film in order to increase the frequency of the film natural vibration. Hardening the film causes the increased reflection on the film surface. It is considered that the harder film is needed for resonance as the frequency sound is higher, most of the sound is reflected by the film surface instead of being absorbed by the resonance vibration, resulting in decreasing of absorption.

Therefore, it has been clarified that it is difficult to absorb a large amount of sound at the high frequency by the silencing unit which uses the film vibration using the fundamental vibration mode based on the design theory in the related art. This characteristic is an unsuitable characteristic for use in silencing a high frequency specific sound.

Further, the hardness of the film used for the silencing unit which uses the film vibration is changed due to a change of a surrounding temperature, a change of surrounding humidity, and the like. In a case in which the hardness of the film is changed, the natural frequency of the film vibration is changed significantly. Therefore, it has been seen that in the case of the silencing unit which uses the film vibration, there is a problem that the frequency that can be silenced is changed depending on the change of the surrounding environment (temperature and humidity). In particular, the temperature inside the motor compartment of the electrified vehicle tends to be high, so that the film is likely to be affected by the temperature.

According to the study by the present inventors, it has been seen that this problem is significantly seen in the fundamental vibration mode.

On the other hand, in a configuration in which the sound absorption coefficient of the film vibration of the film type resonance structure 10 at the frequency in at least one high-order vibration mode is higher than the sound absorption coefficient at the frequency in the fundamental vibration mode, the sound absorption coefficient at the frequency in the high-order vibration mode, that is, the higher-order natural frequency such as the second or third natural frequency is increased, and in a configuration in which the sound is absorbed by the film vibration in the high-order vibration mode, it is not necessary to set the film to be hard and thick, and thus the sound can be suppressed from being reflected by the film, and a high sound absorption effect can be obtained even at a high frequency.

In addition, since the natural frequency in the high-order vibration mode does not change easily even in a case in which the hardness of the film is changed, by using the film vibration in the high-order vibration mode, it is possible to make the change of the higher-order natural frequency small even in a case in which the hardness of the film is changed due to the change of the surrounding environment, and to make the change amount of the frequency that can be silenced small. That is, it is possible to increase robustness against change of the environment. Therefore, a high silencing effect can be obtained even in a case in which the film type resonance structure is disposed in the space in which the temperature change is large, such as in the motor compartment of the electrified vehicle.

The mechanism by which the high-order vibration mode is excited is estimated by the present inventors as follows.

There is the frequency band of the fundamental vibration mode and the high-order vibration mode decided by the conditions of the film (thickness, hardness, size, fixing method, and the like), and decision is made as to which mode of frequency is strongly excited to contribute to sound absorption, by the distance (thickness) of the back space and the like. It will be described below.

In a case in which the resonance of the sound absorbing structure using the film is considered separately, there are a film portion and a back space portion. Therefore, the sound absorption occurs due to the interaction thereof.

In a case of being expressed by a mathematical expression, in a case in which an acoustic impedance of the film is defined as $Z_m$, and an acoustic impedance of the back space is defined as $Z_b$, and a total acoustic impedance is defined as $Z_t = Z_m + Z_b$. The resonance phenomenon occurs in a case in which this total acoustic impedance matches the acoustic impedance of a fluid (air or the like) in the medium. Here, the acoustic impedance $Z_m$ of the film is decided by the film portion, and for example, in the fundamental vibration mode, the resonance occurs in a case in which the component (mass law) according to the equation of motion due to the mass of the film and the component (rigidity law) controlled by tension such as spring due to the fixation of the film. In the high-order vibration mode, the resonance also occurs due to the shape of the film vibration, which is more complicated than the fundamental vibration.

In a case in which it is difficult for the film to generate the high-order vibration mode, such as a case in which the thickness of the film is thick, the band for the fundamental vibration mode becomes wider. However, as described above, since the film is hard and likely to be reflected, the sound absorption is decreased. In a case in which the condition that the high-order vibration mode is likely to be generated in the film, such as thinning the thickness of the film is adopted, the frequency band width in which the fundamental vibration mode is generated is decreased, and the high-order vibration mode is present in the high frequency region.

On the other hand, the acoustic impedance $Z_b$ of the back space is different from the impedance of the open space due to the flow of air propagation sound being restricted by the closed space or the through hole portion, and there is an effect that the back space becomes harder as the thickness of the back space is reduced. Qualitatively, as the back distance is decreased, the distance is suitable for the sound having a short wavelength, that is, the high frequency sound, and in that case, since the back space is too small for the wavelength, the resonance of the lower frequency sound becomes small. That is, which frequency sound can be resonated is decided by the change of the back distance.

Summarizing these, the frequency region in which the fundamental vibration occurs and another band in which the higher-order vibration occurs is decided by the film portion. Further, since the back space decides which frequency band sound is likely to be excited, by setting the frequency as the frequency corresponding to higher-order vibration, the sound absorption coefficient due to the high-order vibration mode can be increased, which is the mechanism.

Therefore, it is necessary to decide both the film and the back space such that the high-order vibration mode is excited.

A simulation was performed on this point by using the acoustic module of the finite element method calculation software COMSOL ver. 5.3 (COMSOL Inc.).

In the calculation model of the film type resonance structure 10, the frame 18 was a cylindrical shape as shown in FIG. 4, and a diameter of the opening portion was 20 mm. The film-like member 16 had a thickness of 50 μm, and the Young's modulus was 4.5 GPa, which is the Young's modulus of polyethylene terephthalate (PET) film.

The calculation model was a calculation model having a two-dimensional axisymmetric structure.

In such a calculation model, the thickness of the back space is changed from 10 mm to 0.5 mm in 0.5 mm increments, and the coupled calculation of acoustic and structure was performed, the structural calculation is performed with respect to the film, and the numerical calculation was performed with respect to the back space by calculating the air propagation of the sound. The evaluation was performed with the vertical incident sound absorption coefficient disposition, and the maximum value of the sound absorption coefficient and the frequency in this case were calculated.

Figure 9:
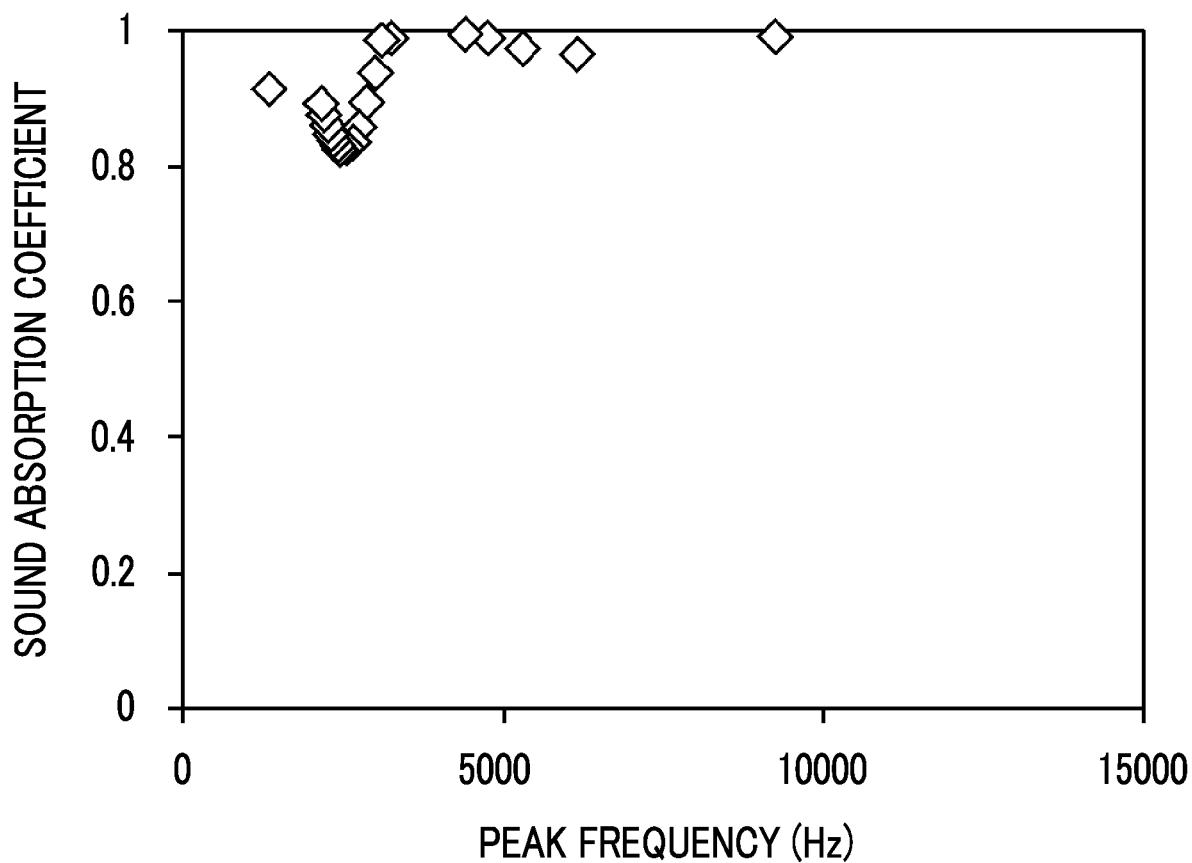
FIG. 9 is a graph showing the relationship between a peak frequency and a sound absorption coefficient.

FIG. 9 shows the results. FIG. 9 is a graph in which the frequency at which the sound absorption coefficient is maximum (hereinafter referred to as a peak frequency) in each calculation model and the sound absorption coefficient at the peak frequency are plotted.

As shown in FIG. 9, it can be seen that a high absorbance can be obtained even at a high frequency.

Further, the order of vibration mode of the peak frequency in each calculation model was analyzed.

Figure 10:
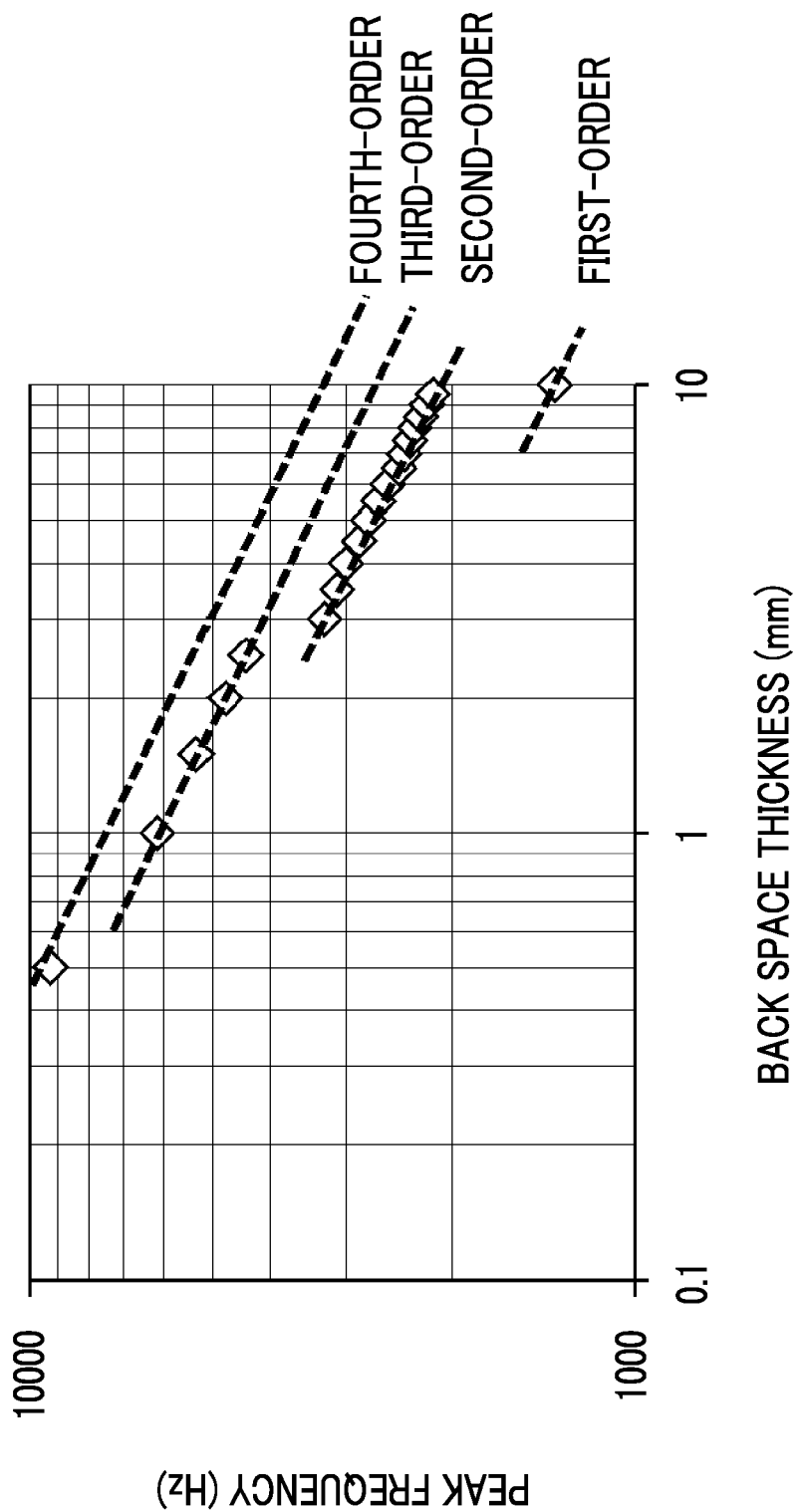
FIG. 10 is a graph showing the relationship between a thickness of a back space and the peak frequency.
Figure 11:
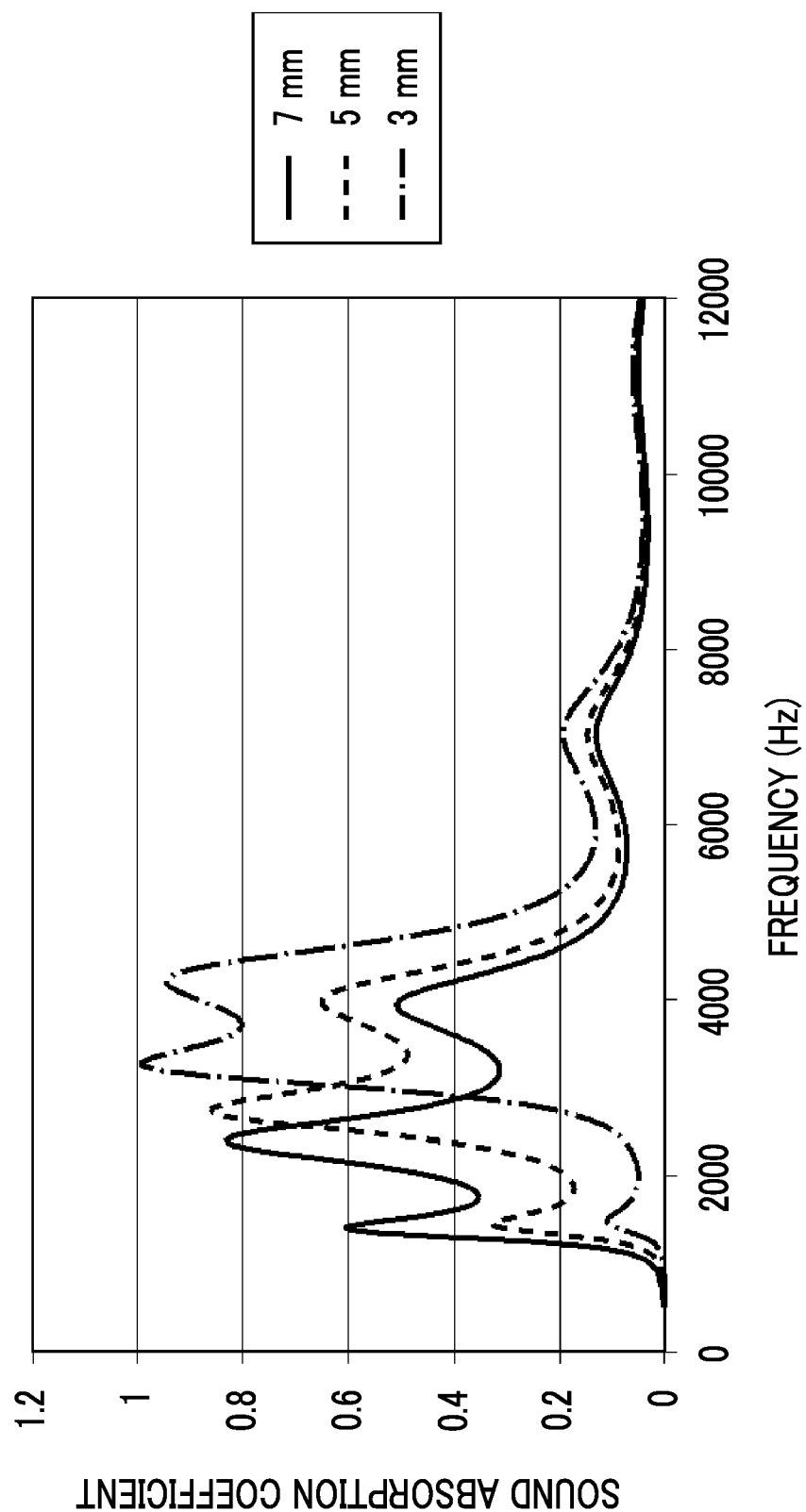
FIG. 11 is a graph showing the relationship between the frequency and the sound absorption coefficient.
Figure 12:
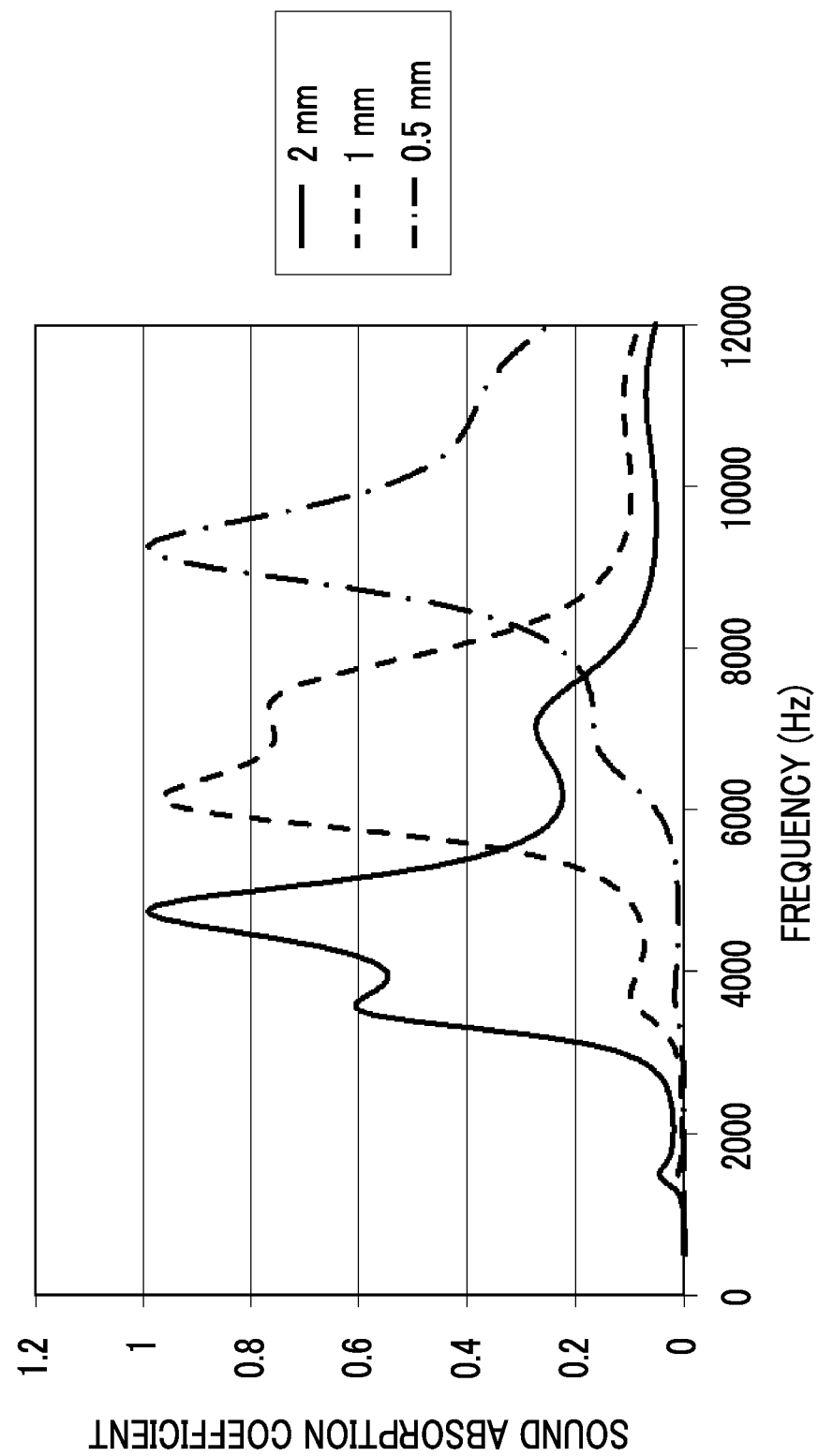
FIG. 12 is a graph showing the relationship between the frequency and the sound absorption coefficient.

FIG. 10 shows a graph in which the relationship between the peak frequency of each calculation model and the thickness of the back space is plotted in both logarithms and a line is drawn for each order of the vibration mode. Further, FIGS. 11 and 12 show graphs showing the relationship between the frequency and the sound absorption coefficient in each calculation model in a case in which the thickness of the back space is 7 mm, 5 mm, 3 mm, 2 mm, 1 mm, and 0.5 mm.

As can be seen based on FIG. 10, the peak frequency of the sound absorption coefficient is increased by reducing the thickness of the back space. Here, it can be seen that the peak frequency does not continuously increase on both logarithmic axes by reducing the thickness of the back space, but a plurality of discontinuous changes occur on both logarithmic axes. This characteristic indicates that the vibration mode in which the sound absorption coefficient is maximized is shifted from the fundamental vibration mode to the high-order vibration mode, or from the high-order vibration mode to a further high-order vibration mode. That is, it was seen that the high-order vibration mode is likely to be excited by the thin film, and the effect of sound absorption by the high-order vibration mode instead of the fundamental vibration mode is greatly exhibited by reducing the thickness of the back space. Therefore, the large sound absorption coefficient in the high frequency region is not caused by the fundamental vibration mode, but by the resonance due to the high-order vibration mode. From the line drawn for each order of the vibration mode shown in FIG. 10, it was seen that in a case in which the hardness of the film is fixed, as the thickness of the back space is thin, the frequency in the high-order vibration mode is the peak frequency, that is, the frequency at which the sound absorption coefficient is the highest.

The reason why the high-order vibration mode is present is that it is important that the film is softened by reducing the film thickness of the film-like member to 50 µm. As compared with the fundamental vibration mode, the high-order vibration mode has a complicated vibration pattern on the film. That is, there are a plurality of amplitude antinodes on the film. Therefore, as compared with the fundamental vibration mode, it is necessary to bend in a smaller plane size, and there are many modes in which bending is required in the vicinity of the film fixed portion. Since the thinner film is easily bent by far, it is important to reduce the film thickness in order to use the high-order vibration mode. Further, by reducing the length of the back space to several mm, it is possible to obtain a system that can efficiently excite the sound absorption in the high-order vibration mode than in the fundamental vibration mode.

Also, since in the system, the film thickness is thin and therefore the hardness of the film is small, it is considered that the reflection is small and a large sound absorption coefficient is generated even on the high frequency side.

Further, based on FIGS. 11 and 12, it can be seen that the sound absorption coefficient has the maximum value (peak) at a plurality of the frequencies in each calculation model. The frequency at which the sound absorption coefficient is the maximum value is the frequency of a certain vibration mode. Among them, the lowest frequency, about 1500 Hz, is the frequency in the fundamental vibration mode. That is, in both calculation models, the frequency in the fundamental vibration mode is about 1500 Hz. Further, the frequency of the maximum value that is present at a frequency higher than 1500 Hz, which is the fundamental vibration mode, is the frequency of the high-order vibration mode. In both calculation models, the sound absorption coefficient at the frequency of the high-order vibration mode is higher than the sound absorption coefficient at the frequency of the fundamental vibration mode.

Further, based on FIGS. 11 and 12, it can be seen that as the thickness of the back space is reduced, the sound absorption coefficient at the frequency in the fundamental vibration mode is decreased, and the sound absorption coefficient at the frequency in the high-order vibration mode is increased.

Also, it can be seen that in a case in which the thickness of the back space in FIG. 12 is 0.5 mm, a large sound absorption coefficient of almost 100% can be obtained in a very high frequency region of 9 kHz or more.

Further, based on FIGS. 11 and 12, it can be seen that a plurality of high-order vibration modes are present, and each frequency exhibits a high sound absorption peak (maximum value of sound absorption coefficient). As a result, it can be seen that the high sound absorption peaks overlap, and the sound absorption effect is exhibited over a relatively wide band.

From the above, it can be seen that a high sound absorption effect can be obtained even at a high frequency by adopting a configuration in which the sound absorption coefficient at the frequency in the high-order vibration mode is higher than the sound absorption coefficient at the frequency in the fundamental vibration mode.

As is known, the fundamental vibration mode is a vibration mode that is present on the lowest frequency side, and the high-order vibration mode is a vibration mode other than the fundamental vibration mode.

Whether the vibration mode is the fundamental vibration mode or the high-order vibration mode can be determined based on the state of the film-like member. In the film vibration in the fundamental vibration mode, the center of gravity of the film has the largest amplitude, and the amplitude in the vicinity of the peripheral fixed end portion is small. Also, the film-like member has speed in the same direction in all regions. On the other hand, in the film vibration in the high-order vibration mode, in the film-like member, a portion having speed in the opposite direction depending on the position is present.

Alternatively, in the fundamental vibration mode, the fixed portion of the film is a vibration node, and there is no node on the other film surface. On the other hand, in the high-order vibration mode, in addition to the fixed portion, there is a portion that is a vibration node on the film according to the above definition, so that the actual measurement can be performed by the method shown below.

In the analysis of the vibration mode, the vibration mode can be directly observed by measuring the film vibration by using laser interference. Alternatively, since the position of the node is visualized by sprinkling salt or white fine particles on the film surface and vibrating, the vibration mode can be directly observed even by using this method. This visualization of the mode is known as the Chladni figure.

Also, the frequency can be obtained analytically for a circular film or a rectangular film. In a case in which a numerical calculation method such as the finite element method calculation is used, the frequency in each vibration mode can be obtained for any film shape.

Further, the sound absorption coefficient can be obtained by the sound absorption coefficient evaluation by using an acoustic tube. A measurement system for the vertical incident sound absorption coefficient according to JIS A 1405-2 is prepared, and evaluation is performed. WinZac MTX manufactured by Nihon Onkyo Engineering Co., Ltd. can be used for the same measurement. The internal diameter of the acoustic tube is 20 mm, a film type resonance structure is disposed at the end portion of the acoustic tube with the film-like member facing up, the reflectance is measured, and (1−reflectance) is obtained to perform evaluation of the sound absorption coefficient.

As the diameter of the acoustic tube is decreased, the higher frequency can be measured. In this case, since it is necessary to measure the sound absorption coefficient characteristic of the high frequency, the acoustic tube with a diameter of 20 mm is selected.

In the film type resonance structure 10 according to the embodiment of the present invention, in order to adopt a configuration in which the sound absorption coefficient at the frequency in at least one high-order vibration mode is higher than the sound absorption coefficient at the frequency in the fundamental vibration mode, the thickness of the back space 24, and the size, the thickness, and the hardness of the film-like member 16 need only be adjusted.

Specifically, in a case in which a wavelength of a peak frequency of the narrow band sound generated by the sound source is λ, it is preferable that the thickness (thickness in the direction perpendicular to the surface of the film-like member) of the back space 24 be λ/6 or less. The thickness of the back space 24 is preferably 10 mm or less, more preferably 5 mm or less, further preferably 3 mm or less, and particularly preferably 2 mm or less in order to absorb the sound on the high frequency side.

In a case in which the thickness of the back space 24 is not uniform, the average value need only be in the above range.

The thickness of the film-like member 16 is preferably less than 100 µm, more preferably 70 µm or less, and further preferably 50 µm or less. In a case in which the thickness of the film-like member 16 is not uniform, the average value need only be in the above range.

On the other hand, in a case in which the thickness of the film is too thin, it is difficult to be treated. The film thickness is preferably 1 µm or more, and more preferably 5 µm or more.

The Young's modulus of the film-like member 16 is preferably 1000 Pa to 1000 GPa, more preferably 10000 Pa to 500 GPa, and most preferably 1 MPa to 300 GPa.

The density of the film-like member 16 is preferably 10 kg/m$^3$ to 30000 kg/m$^3$, more preferably 100 kg/m$^3$ to 20000 kg/m$^3$, and most preferably 500 kg/m$^3$ to 10000 kg/m$^3$.

The shape (shape of the region of the film vibration) of the film-like member 16, that is, the shape of the opening cross section of the frame 18 is not particularly limited, and may be other quadrilaterals such as a square, a rectangle, a rhombus, or a parallelogram, triangles such as an equilateral triangle, an isosceles triangle, or a right triangle, polygons including a regular polygon such as a regular pentagon or a regular hexagon, a circle, an oval, or the like, or may be undefined shape.

The size (size of the region of the film vibration) of the film-like member 16, that is, the size of the opening cross section of the frame 18 is preferably 1 mm to 100 mm, more preferably 3 mm to 70 mm, and further preferably 5 mm to 50 mm in circle equivalent diameter ($L_a$ in FIG. 5).

Here, the present inventors have examined in more detail the mechanism by which the high-order vibration mode is excited in the film type resonance structure 10.

Assuming that the Young's modulus of the film-like member was E(Pa), the thickness of the film-like member was t(m), the thickness of the back space (back distance) was d(m), and the circle equivalent diameter of the region in which the film-like member vibrates, that is, the circle equivalent diameter of the opening portion of the frame in a case in which the film-like member is fixed to the frame was Φ(m), these parameters were changed in various manners, a simulation was performed by using the acoustic module of the finite element method calculation software COMSOL ver. 5.3 (COMSOL Inc.), and condition in which the high-order vibration mode is excited was obtained.

Specifically, a columnar waveguide obtained by simulating the acoustic tube was set in a three-dimensional space, and a back space portion and a film-like member portion were installed at the end portion thereof. The end portion was a reflective end by setting it a sound hard surface. The film-like member portion was the target of the structural mechanics module calculation, and the acoustic structure interaction was calculated by strong coupling by setting an acoustic structure coupled surface with the air portion around the film-like member portion. In addition, by setting the end portion of the film-like member portion as a fixed constraint condition, the film vibration with the periphery suppressed was calculated.

The other end of the acoustic tube was a plane wave radiating surface, and the input energy and the reflected energy of reflected sound were obtained on the surface. In a case in which the input energy is standardized to 1, the sound absorption coefficient can be obtained as 1−reflectance.

Based on this condition, the frequency was changed, and the frequency dependency of the sound absorption coefficient was calculated. With this dependency, the sound absorption peaks can be assigned as first and second from the low frequency side. In addition, the solid vibration pattern on the film surface was also confirmed to confirm that the mode was the first mode.

Under such calculation settings, each sound absorption peak position was obtained by performing calculation by parametrically changing (E, t, d).

As a result, it was seen that in a case in which that the Young's modulus of the film-like member was E(Pa), the thickness of the film-like member was t(m), the thickness of the back space (back distance) was d(m), and the circle equivalent diameter of the region in which the film-like member vibrates, that is, the circle equivalent diameter of the opening portion of the frame in a case in which the film-like member is fixed to the frame was 1(m), it is preferable that the hardness of the film-like member is E×t$^3$ (Pa·m$^3$) be set to $21.6 \times d^{-1.25} \times \Phi^{4.15}$ or less. Under this condition, the sound absorption coefficient of the high-order vibration mode can be made larger than the sound absorption coefficient of the fundamental vibration mode. First, it was seen that E×t$^3$ is a parameter that controls the hardness of the film, not a single parameter such as Young's modulus and thickness. Next, it was seen that the influence of the dependency on the back distance and the dependency on the size (equal to the size of the vibrable portion of the film) of the frame (opening portion) on the hardness can be expressed by the coefficient of the above expression. As a result of examination based on these, it was clarified that the range of the above expression needs to be satisfied in order to make the sound absorption coefficient of the high-order vibration mode larger than the sound absorption coefficient of the fundamental vibration mode. Further, it was seen that in a case in which a coefficient a is expressed as $a \times d^{-1.25} \times \Phi^{4.15}$, it is preferable that the coefficient a be lower, such as 11.1 or less, 8.4 or less, 7.4 or less, 6.3 or less, 5.0 or less, 4.2 or less, and 3.2 or less. By limiting the value to this range, the sound absorption coefficient of the high-order vibration mode is larger than the sound absorption coefficient of the fundamental vibration mode.

Further, it was seen that the hardness $E \times t^3$ (Pa·m³) of the film-like member is preferably $2.49 \times 10^{-7}$ or more, more preferably $7.03 \times 10^{-7}$ or more, further preferably $4.98 \times 10^{-6}$ or more, still further preferably $1.11 \times 10^{-5}$ or more, particularly preferably $3.52 \times 10^{-5}$ or more, and most preferably $1.40 \times 10^{-4}$ or more. In a case in which the film is too soft, only the mass of the film functions and the vibration spring element does not function, that is, only the mass and the back space resonate. In this case, it was seen that the maximum sound absorption coefficient tends to be decreased. Accordingly, it is necessary to satisfy these conditions in order to increase the sound absorption coefficient.

By setting the hardness of the film-like member within the above range, it is possible to suitably excite the high-order vibration mode in the film type resonance structure 10.

Here, the sound absorption coefficient at the frequency in at least one high-order vibration mode in which the sound absorption coefficient is higher than the sound absorption coefficient at the frequency in the fundamental vibration mode, is preferably 20% or more, more preferably 30% or more, further preferably 50% or more, particularly preferably 70% or more, and most preferably 90% or more.

In the following description, the high-order vibration mode in which the sound absorption coefficient is higher than the sound absorption coefficient at the frequency in the fundamental vibration mode is also simply referred to as "high-order vibration mode", and the frequency thereof is also simply referred to as "frequency in high-order vibration mode".

Further, it is preferable that the sound absorption coefficients at the frequencies of two or more high-order vibration modes be 20% or more, respectively.

By setting the sound absorption coefficient to 20% or more at frequencies of a plurality of the high-order vibration modes, the sound can be absorbed at a plurality of the frequencies.

Further, it is preferable that the vibration mode have continuous high-order vibration modes in which the sound absorption coefficient is 20% or more. That is, for example, it is preferable that the sound absorption coefficient at the frequency in the second vibration mode and the sound absorption coefficient at the frequency in the third vibration mode be 20% or more, respectively.

Further, in a case in which there are continuous high-order vibration modes in which the sound absorption coefficient is 20% or more, it is preferable that the sound absorption coefficient be 20% or more over the entire band between the frequencies of these high-order vibration modes.

As a result, the sound absorption effect can be obtained in a wide band.

Further, from the viewpoint of obtaining a sound absorption effect in the audible range, the frequency in the high-order vibration mode in which the sound absorption coefficient is 20% or more is preferably present in the range of 1 kHz to 20 kHz, more preferably present in the range of 1 kHz to 15 kHz, further preferably present in the range of 1 kHz to 12 kHz, and particularly preferably present in the range of 1 kHz to 10 kHz.

The audible range is 20 Hz to 20000 Hz, in the present invention.

Further, in the audible range, the frequency at which the sound absorption coefficient is maximized is preferably present at 2 kHz or more, more preferably present at 4 kHz or more, further preferably present at 6 kHz or more, and particularly preferably present at 8 kHz or more.

Further, from the viewpoint of miniaturization, the thickness of the most thick portion ($L_o$ in FIG. 5) of the film type resonance structure 10 is preferably 10 mm or less, more preferably 7 mm or less, and further preferably 5 mm or less. The lower limit value of the thickness is not limited as long as the film-like member can be appropriately supported, but it is preferably 0.1 mm or more, and further preferably 0.3 mm or more.

Figure 13:
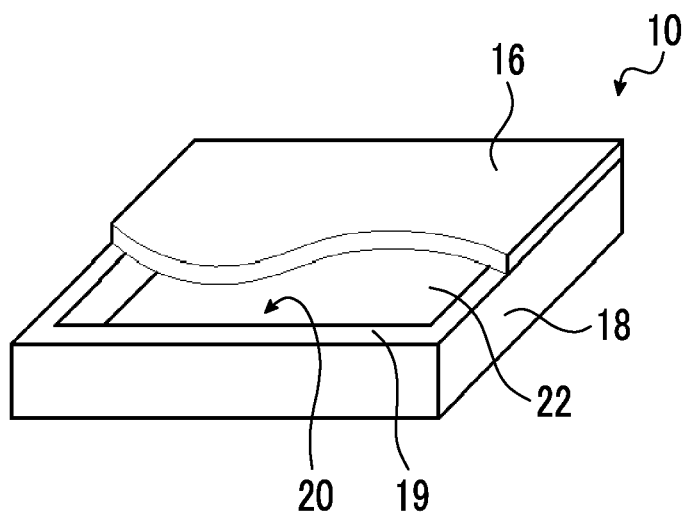
FIG. 13 is a schematic perspective view showing a still another example of the film type resonance structure.

Further, in the example shown in FIG. 1, the frame 18 has a cylindrical shape, but the shape is not limited to this, and it may be various shapes as long as the film-like member 16 can be supported to allow vibration thereof. For example, as shown in FIG. 13, the frame 18 may have a rectangular parallelepiped shape in which the opening portion 20 having a bottom surface is formed on one surface, that is, a box shape having one surface open. Further, in FIG. 13, a part of the film-like member 16 is omitted for the sake of explanation.

Further, in the examples shown in FIGS. 4 and 5, the back space 24 is a closed space completely surrounded by the frame 18 and the film-like member 16, but is not limited to this, the space need only be substantially partitioned such that the flow of air is obstructed, and an opening may be provided in a part of the film or other portions other than the completely closed space. Such a form providing the opening in a part thereof is preferable from the point that a change in the sound absorption characteristic as a gas in the back space 24 expands or contracts due to a temperature change or an atmospheric pressure change, tension is applied to the film-like member 16, and the hardness of the film-like member is changed is prevented.

Figure 14:
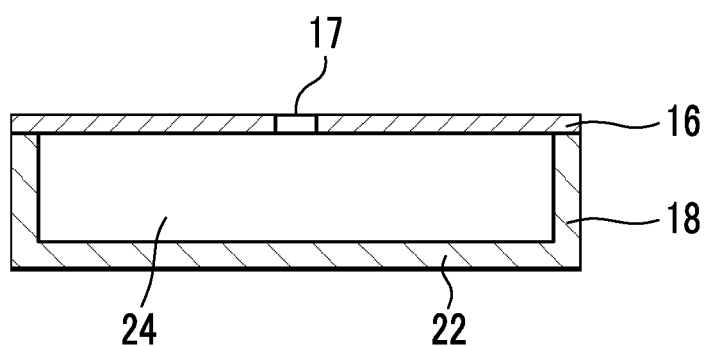
FIG. 14 is a schematic cross-sectional view showing a still another example of the film type resonance structure.

For example, a through hole 17 may be formed in the film-like member 16, as in the example shown in FIG. 14.

It is possible to adjust the peak frequency by providing the through hole 17.

By forming the through hole in the film portion, propagation by air propagation sound occurs. Due to this, the acoustic impedance of the film is changed. Also, the mass of the film is decreased due to the through hole. It is considered that the resonance frequency is changed by above. Therefore, it is possible to control the peak frequency by the size of the through hole.

The position in which the through hole is formed is not particularly limited. For example, in a case in which the through hole is provided in the film-like member, a configuration may be adopted in which the through hole is provided at the center position in the surface direction of the film-like member, and a configuration may be adopted in which the through hole is provided at a position in the vicinity of the end portion fixed to the frame.

In this case, the sound absorption coefficient and the sound absorption peak frequency (hereinafter, also referred to as sound absorption spectrum) are changed depending on the position of the through hole. For example, as compared with the case where the through hole is not formed, the change amount of the sound absorption spectrum in a case in which the through hole is formed at the center position is larger than that of a case in which the through hole is formed at the position in the vicinity of the end portion.

The size of the through hole 17 is not particularly limited as long as it is a size that the flow of air is obstructed. Specifically, within a range smaller than the size of the vibration portion, the size thereof is, by the circle equivalent diameter, preferably 0.1 mm to 10 mm, more preferably 0.5 mm to 7 mm, and further preferably 1 mm to 5 mm.

Further, the area of the through hole 17 is preferably 50% or less, more preferably 30% or less, and further preferably 10% or less, based on the vibration portion area.

Even in a case in which there are a plurality of the through holes, the same adjustment can be made.

Further, the film-like member may have a configuration in which one or more cut portions which penetrates from one surface to the other surface are provided. The cut portion is preferably formed in a region in which the film-like member vibrates, and is more preferably formed at the end portion of the vibration region. Further, the cut portion is preferably formed along the boundary between the region in which the film-like member vibrates and the region fixed to the frame.

The length of the cut portion is not limited as long as the region in which the film-like member vibrates is not completely divided, but it is preferably less than 90% based on the frame diameter.

Also, one cut portion may be formed, or two or more cut portions may be formed.

By forming the cut portion in the film-like member, the frequency of sound absorption can be broadened (widened).

Figure 15:
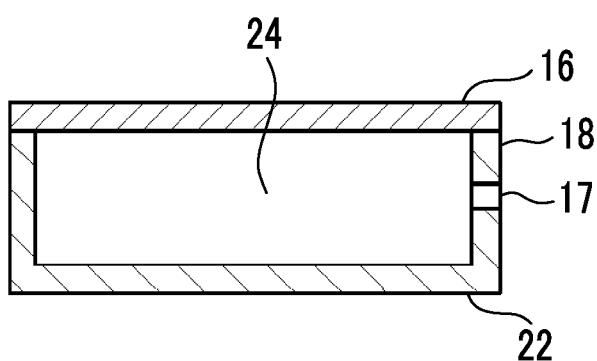
FIG. 15 is a schematic cross-sectional view showing a still another example of the film type resonance structure.

Alternatively, the through hole 17 may be formed in the frame 18, as in the example shown in FIG. 15.

Figure 16:
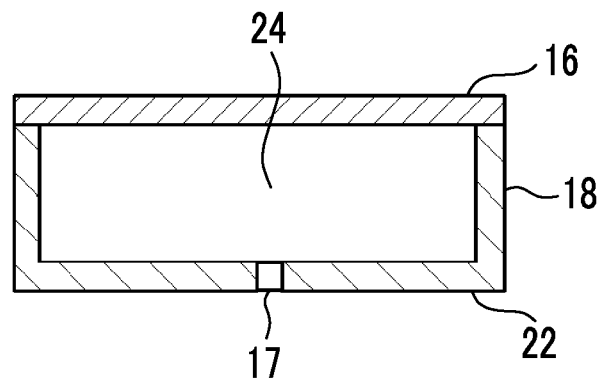
FIG. 16 is a schematic cross-sectional view showing a still another example of the film type resonance structure.

Alternatively, the through hole 17 may be formed in the back plate 22, as in the example shown in FIG. 16.

As a result, the air permeability inside and outside the film type resonance structure can be ensured, and expansion of each portion (particularly the film-like member) and dew condensation due to the temperature and humidity change or the atmospheric pressure change can be prevented.

Figure 17:
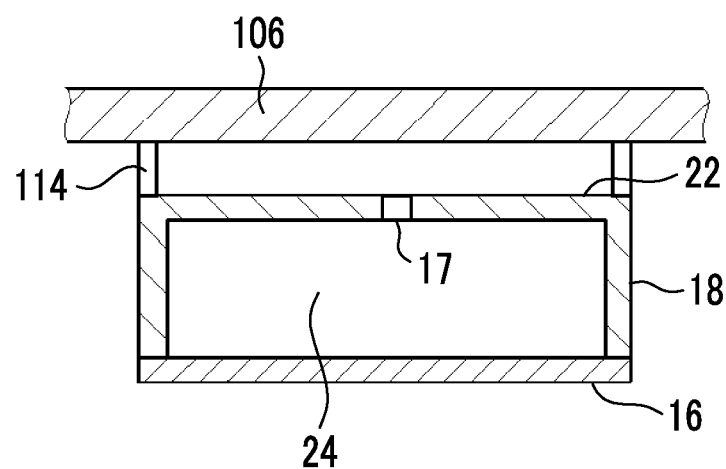
FIG. 17 is a schematic cross-sectional view showing a still another example of the film type resonance structure.

In a case in which the through hole is provided in the frame and/or the back plate, the position in which the through hole is provided is not particularly limited. For example, it is desirable that the film type resonance structure has the through hole at a position in the vicinity of the component of the electrified vehicle, and the film surface on another surface. For example, as shown in FIG. 17, there is a configuration in which the through hole 17 is provided in the back plate 22, and the component of the electrified vehicle (for example, hood 106) is provided at a position close to the surface thereof. The film-like member 16 faces an open direction opposite to the hood 106, and vibration is not restricted with respect to sound. On the other hand, since the through hole 17 is separated from and close to the hood 106 (about several mm, it may be about 1 mm or less), the wind hardly flows in and there is no concern about wind noise, on the other hand, the effect of improving environmental resistance, which is the effect of the through hole 17, can be obtained. Further, as shown in FIG. 17, the film type resonance structure 10 need only be attached to the hood 106 (component of the electrified vehicle) by using the spacer 114. The spacer 114 may be a frame-like member or may be configured to have a columnar member and be disposed at four corners of the film type resonance structure 10.

Figure 18:
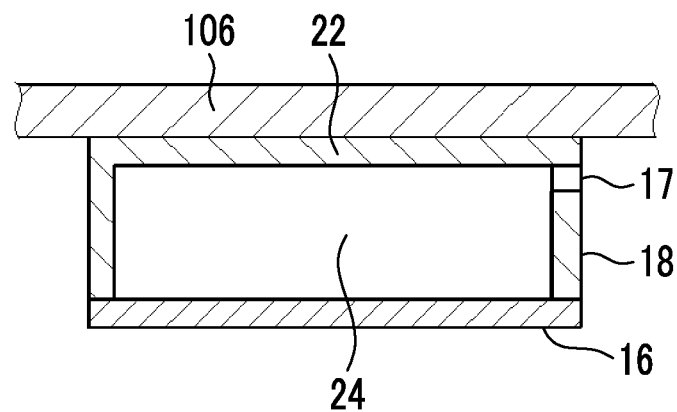
FIG. 18 is a schematic cross-sectional view showing a still another example of the film type resonance structure.

Further, as in the example shown in FIG. 18, in a case in which the back plate 22 is directly attached to the component (hood 106) of the electrified vehicle, and in a case in which the back plate 22 and/or the frame 18 is configured to be integrated with the component (hood 106) of the electrified vehicle, by making the through hole 17 in the frame 18 at the position in the vicinity of the component of the electrified vehicle, the wind at the portion is weakened, so that the wind noise is also reduced.

Also, the back plate may be a film-like member that can vibrate. By configuring the back plate in a film-like member, the weight of the film type resonance structure can be reduced. Further, the sound absorption effect can be obtained by vibration of the back plate.

Further, in the example shown in FIG. 4, the film type resonance structure is configured to use the frame having one opening portion and the back plate, but the present invention is not limited to this, and the film type resonance structure may be configured to use the frame having two or more opening portions and dispose the film-like member in each opening portion. Stated another way, the film type resonance structure having a configuration in which the film type resonance structure having the frame having one opening portion and one film-like member is one soundproof cell, and the frames and the back plates of a plurality of the soundproof cells are integrated may be adopted. Further, it may be a structure in which the film-like members of the soundproof cells may be integrated.

Figure 20:
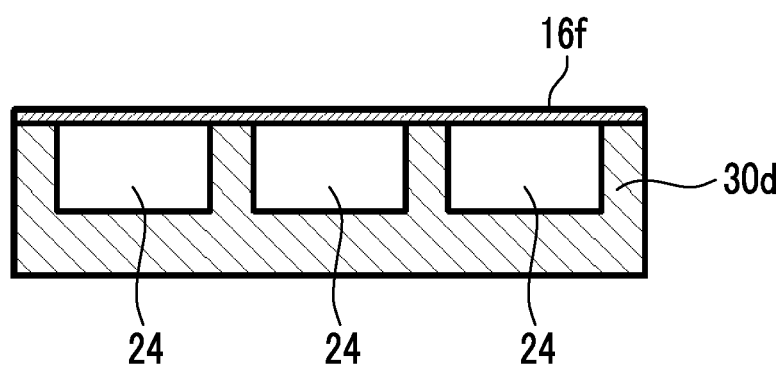
FIG. 20 is a schematic cross-sectional view showing a still another example of the film type resonance structure.

For example, in the example shown in FIG. 20, the film type resonance structure has a frame 30*d* having three opening portions formed on the same surface, and a film-like member 16*f* having a size that covers the three opening portions, and the film-like member 16*f* is fixed to the surface of the frame 30*d* on which the three opening portions are formed by an adhesive/pressure sensitive adhesive, or the like. The film-like member 16*f* covers each of the three opening portions, and each opening portion can vibrate independently. Further, in each opening portion, the back space 24 is formed surrounded by the film-like member 16*f* and the frame 30*d*. That is, in the example shown in FIG. 20, the film type resonance structure has a configuration in which three soundproof cells are provided, and the frame, the back space, and the film-like member of each soundproof cell are integrated.

Here, in the example shown in FIG. 20, a configuration is adopted in which the soundproof cells have the same thickness, and are arranged in the same plane, but the present invention is not limited to this. From the viewpoint of thickness, it is preferable that the soundproof cells have the same thickness and be arranged in the same plane.

Further, in the example shown in FIG. 20, the soundproof cells are configured to have the same specifications and have the same resonance frequencies, but the present invention is not limited to this, and the film type resonance structure may be configured to include the soundproof cells having different resonance frequencies. Specifically, the film type resonance structure may have the soundproof cell in which at least one of the thickness of the back space, the material of the film, the thickness of the film, or the like is different.

Figure 21:
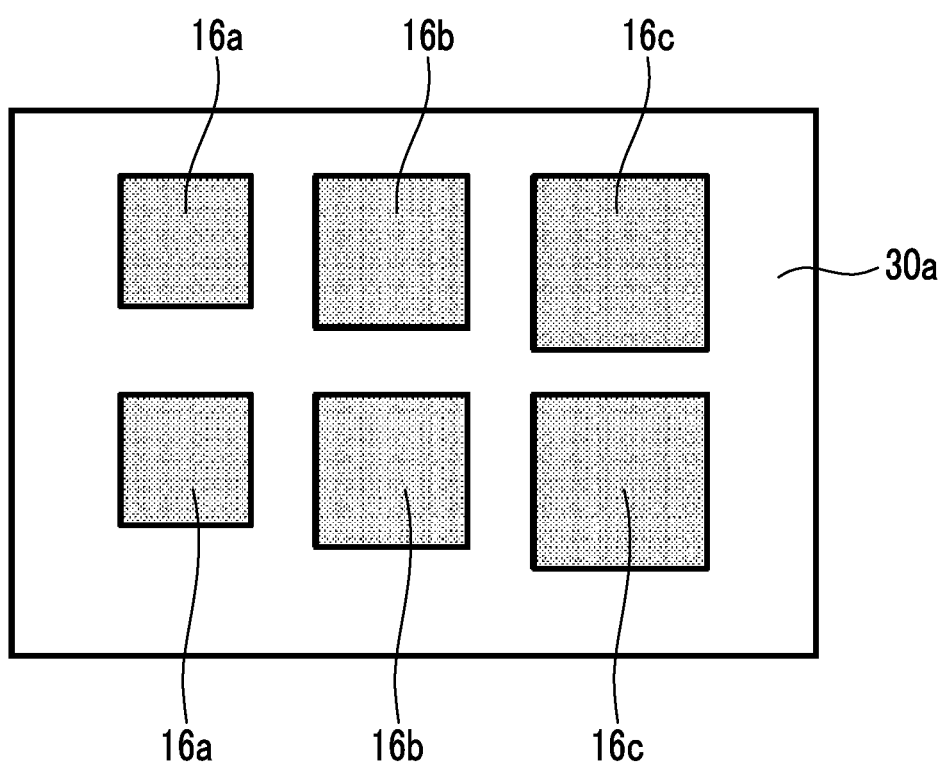
FIG. 21 is a schematic plan view showing a still another example of the film type resonance structure.

For example, in the example of the film type resonance structure shown in FIG. 21, a frame 30*a* has two opening portions of three types having different sizes, and film-like members 16*a* to 16*c* having different sizes are disposed in each opening portion. That is, the film type resonance structure of the example shown in FIG. 21 has a configuration including three types of the soundproof cells having different resonance frequencies due to the difference in the area of the region in which the film-like member vibrates.

Figure 22:
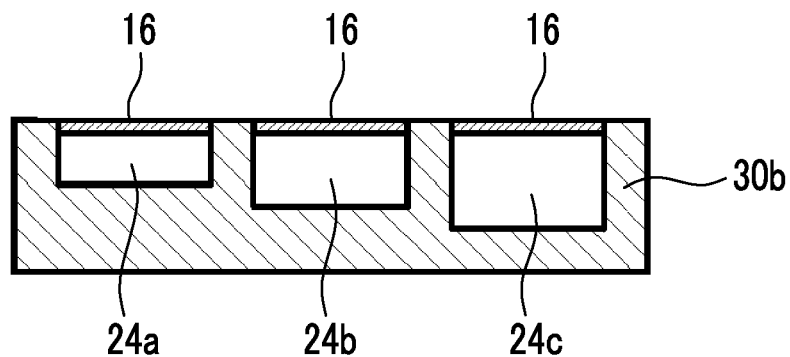
FIG. 22 is a schematic cross-sectional view showing a still another example of the film type resonance structure.

Further, in the film type resonance structure shown in FIG. 22, a frame 30b has three types of opening portions having different depths, and the film-like member 16 having is disposed in each opening portion. That is, each soundproof cell has back spaces 24a to 24c which have different thicknesses. Therefore, the film type resonance structure of the example shown in FIG. 22 has a configuration including three soundproof cells which have different resonance frequencies due to different thicknesses of the back space.

Figure 23:
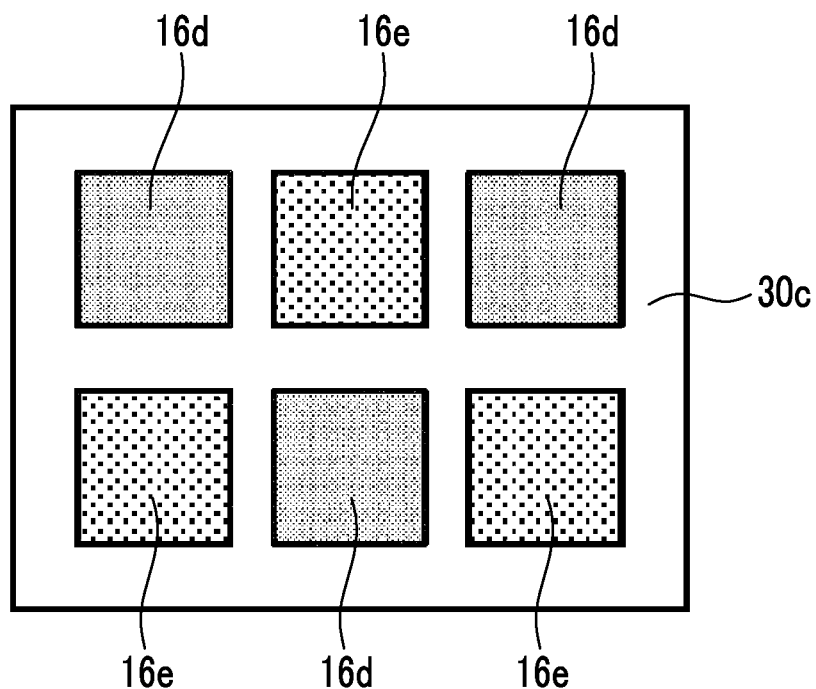
FIG. 23 is a schematic plan view showing a still another example of the film type resonance structure.

Further, the film type resonance structure of the example shown in FIG. 23 has two types of film-like members 16d and 16e which are made of different materials, and a frame 30c having six opening portions, and any one of the two types of the film-like members 16d and 16e is alternately disposed in each of the six opening portions. Therefore, the film type resonance structure of the example shown in FIG. 23 has a configuration including two types of soundproof cells which have different resonance frequencies due to different materials of the film-like members.

As the film type resonance structure shown in FIGS. 21 to 23, by adopting a configuration in which the soundproof cells having different resonance frequencies are provided, it is possible to silence the sounds simultaneously in a plurality of frequency bands.

In the examples shown in FIGS. 21 to 23, the film type resonance structure has a configuration in which the frames of the soundproof cells are integrated, but the present invention is not limited to this, and it is possible to handle a plurality of the frequencies by arranging or laying out independent soundproof cells that silence the sound in different frequency bands.

Figure 19:
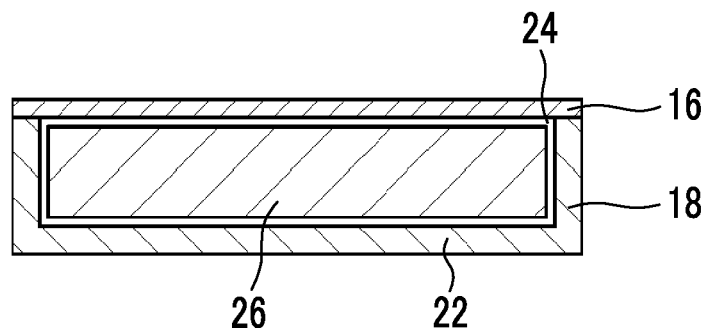
FIG. 19 is a schematic cross-sectional view showing a still another example of the film type resonance structure.

Further, as in the example shown in FIG. 19, the film type resonance structure according to the embodiment of the present invention may have a configuration in which a porous sound absorbing body 26 is provided in the back space 24.

By disposing the porous sound absorbing body 26 in the back space 24, the peak sound absorption coefficient can be reduced, but the band can be widened to the low frequency side.

Figure 24:
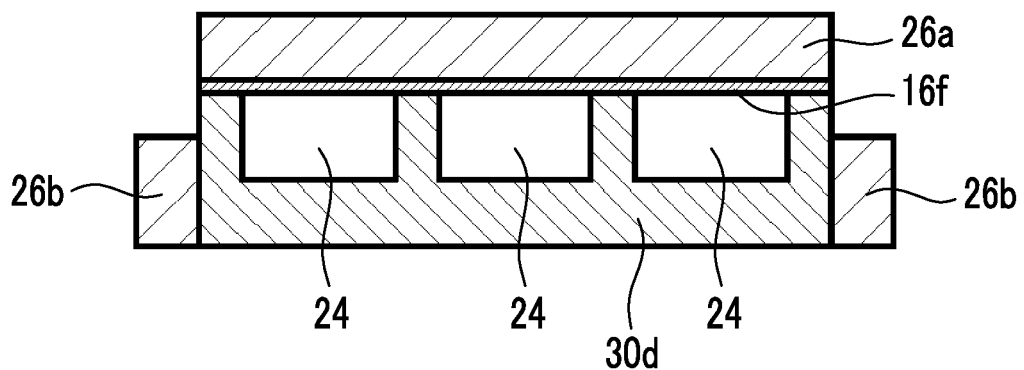
FIG. 24 is a schematic cross-sectional view showing a still another example of the film type resonance structure.

Further, as in the example shown in FIG. 24, the film type resonance structure may have a porous sound absorbing body 26a disposed on the upper surface of the film-like member 16f (the surface opposite to the frame 30d), or may have a porous sound absorbing body 26b disposed on the outer surface such as the side surface and the bottom surface of the frame 30d. As a result, it is possible to combine the resonance silencing by the film vibration and the wide band sound absorption effect by the porous sound absorbing body.

The porous sound absorbing body 26 is not particularly limited, and a known porous sound absorbing body in the related art can be appropriately used. For example, various known porous sound absorbing bodies can be used such as foam materials and materials including minute air such as urethane foam, soft urethane foam, wood, ceramic particle sintered material, phenol foam, and the like; fiber and nonwoven materials such as glass wool, rock wool, microfibers (Thinsulate manufactured by 3M), floor mats, carpets, meltblown nonwovens, metal nonwovens, polyester nonwovens, metal wool, felt, insulation boards and glass nonwovens; and wood wool cement board; nanofiber materials such as silica nanofiber; gypsum board; and the like.

A flow resistance $\sigma_1$ of the porous sound absorbing body is not particularly limited, but is preferably 1000 to 100,000 (Pa·s/m$^2$), more preferably 5000 to 80000 (Pa·s/m$^2$), and further preferably 10000 to 50000 (Pa·s/m$^2$).

The flow resistance of the porous sound absorbing body can be evaluated by measuring a vertical incident sound absorption coefficient of the porous sound absorbing body having a thickness of 1 cm and fitting by the Mild model (J. Acoust. Soc. Jpn., 11(1), pp. 19 to 24 (1990)). Alternatively, evaluation may be made according to "ISO 9053".

Examples of the material of the frame 18 and the back plate 22 (hereinafter, collectively referred to as a frame material) include a metal material, a resin material, a reinforced plastic material, carbon fiber, and the like. Examples of the metal material include metal materials such as aluminum, titanium, magnesium, tungsten, iron, steel, chromium, chromium molybdenum, nichrome molybdenum, copper, alloys thereof, and the like. Examples of the resin material include resin materials such as an acrylic resin, polymethyl methacrylate, polycarbonate, polyamide-imide, polyarylate, polyetherimide, polyacetal, polyether ether ketone, polyphenylene sulfide, polysulfone, polyethylene terephthalate, polybutylene terephthalate, polyimide, an acrylonitrile, butadiene, styrene copolymer synthetic resin (ABS resin), polypropylene, triacetyl cellulose, and the like. In addition, examples of the reinforced plastic material include carbon fiber reinforced plastics (CFRP), and glass fiber reinforced plastics (GFRP). Further, natural rubber, chloroprene rubber, butyl rubber, ethylene/propylene/diene rubber (EPDM), silicone rubber, and the like, and rubbers containing these crosslinked structures are exemplary examples.

Further, as the frame material, various honeycomb core materials can be used. Since the honeycomb core material is lightweight and used as a highly rigid material, ready-made product thereof is easily available. As the frame, it is possible to use the honeycomb core material made of various materials such as aluminum honeycomb core, FRP honeycomb core, paper honeycomb core (manufactured by Shin Nippon Feather Core Co., Ltd, manufactured by Showa Aircraft Group Co., Ltd., or the like), thermoplastic resin (PP, PET, PE, PC, or the like) honeycomb core (TECCELL manufactured by Gifu Plastic Industry Co., Ltd., or the like).

Further, a structure including air, that is, a foam material, a hollow material, a porous material, or the like can also be used as the frame material. In a case in which the film type resonance structure which has a large number of films is used, a frame can be formed by using, for example, a closed-cell foam material in order to prevent ventilation between the cells. For example, various materials such as closed-cell polyurethane, closed-cell polystyrene, closed-cell polypropylene, closed-cell polyethylene, and closed-cell rubber sponge can be selected. By using closed-cell material, sound, water, gas, or the like is not allowed to pass through, and the structural strength is high as compared with an open cell material, and thus it is suitable for being used as the frame material. Further, in a case in which the porous sound absorbing body described above has sufficient supportability, the frame may be formed only by the porous sound absorbing body, and examples of the porous sound absorbing body and the material of the frame are used in combination by for example, mixing or kneading. As described above, the weight of the device can be reduced by using the material system including air inside. In addition, the heat insulating property can be imparted.

Here, from the viewpoint of being capable of disposing at the high temperature position, it is preferable that the frame 18 and the back plate 22 be made of a material having higher heat resistance than the flame retardant material. Heat resistance can be defined, for example, by the time that satisfies each item of Article 108-2 of the Building Standards Law Enforcement Ordinance. In a case in which the time that satisfies each item of Article 108-2 of the Building Standards Law Enforcement Ordinance is 5 minutes or more and less than 10 minutes, it is a flame retardant material, in a case in which the time is 10 minutes or more and less than 20 minutes, it is a semi-incombustible material, and in a case in which the time is 20 minute or more, it is a non-combustible material. However, in many cases, the heat resistance is defined for each field. Therefore, the frame 18 and the back plate 22 need only be made of a material having the heat resistance equivalent to or higher than the flame retardance defined in the field, depending on the field in which the film type resonance structure is used.

The wall thickness (frame thickness) and thickness (height in the direction perpendicular to the opening surface, $L_b$ in FIG. 5) of the frame 18 are also not particularly limited as long as the film-like member 16 can be securely fixed and supported, for example, it can be set depending on the size of the opening cross section of the frame 18, or the like.

Also, the thickness of the back plate ($t_1$ in FIG. 5) is not particularly limited.

Examples of the film-like member 16 include various metals such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and resin materials such as polyethylene terephthalate (PET), triacetyl cellulose (TAC), polyvinylidene chloride (PVDC), polyethylene (PE), polyvinyl chloride (PVC), polymethylpentene (PMP), cycloolefin polymer (COP), zeonoa, polycarbonate, polyethylene naphthalate (PEN), polypropylene (PP), polystyrene (PS), polyarylate (PAR), aramid, polyphenylene sulfide (PPS), polyether sulfone (PES), nylon, polyester (PEs), cyclic olefin copolymer (COC), diacetyl cellulose, nitro cellulose, cellulose derivative, polyamide, polyamide-imide, polyoxymethylene (POM), polyetherimide (PEI), polyrotaxane (slide ring material or the like), and polyimide. Further, glass materials such as thin film glass and fiber reinforced plastic materials such as carbon fiber reinforced plastic (CFRP) and glass fiber reinforced plastic (GFRP) can also be used. Further, natural rubber, chloroprene rubber, butyl rubber, EPDM, and silicone rubber, and rubbers containing these crosslinked structures can be used. Alternatively, the combination thereof may be used.

In a case in which the metal material is used, the surface may be metal-plated from the viewpoint of suppressing rust.

From the viewpoint of excellent durability against heat, ultraviolet rays, external vibration, or the like, it is preferable to use the metal material as the material of the film-like member 16 in applications requiring durability.

Further, a fixing method of the film-like member 16 to the frame 18 is not particularly limited, and a method of using a double-sided tape or an adhesive, a mechanical fixing method such as screwing, crimping or the like can be appropriately used. The fixing method can also be selected from the viewpoints of heat resistance, durability, and water resistance as in the case of the frame and the film body. For example, as the adhesive, "Super X" series manufactured by CEMEDINE Co., Ltd., "3700 series (heat resistant)" manufactured by ThreeBond Holdings Co., Ltd., heat resistant epoxy adhesive "Duralco series" manufactured by TAIYO WIRE CLOTH CO., LTD., and the like can be selected. Further, as the double-sided tape, Ultra High Temperature Double Coated Tape 9077 manufactured by 3M or the like can be selected. As described above, various fixing methods can be selected for the required characteristics.

In addition, in vehicles (electrified vehicles), the adhesives are often used, and thus above materials can also be used. By using an epoxy adhesive, an urethane adhesive, or the like that has a proven track record used in vehicles as the structural adhesive, it is possible to obtain performance that can withstand the durability of vehicle applications. Further, a one-pack adhesive may be used, or a two-pack adhesive may be used in order to lower the hardening temperature to about room temperature. For example, 3M Scotch-Weld series manufactured by 3M can be selected.

As for the double-sided tape, the double-sided tape in the related art used in vehicles can also be used. For example, it is possible to select Scotch (registered trademark) strong double-sided tape [for vehicle interior] SCP-15, Scotch strong double-sided tape [for vehicle exterior] KCA-15, and Scotch super strong double-sided tape, premier gold [for vehicle interior] KCR-15, which are manufactured by 3M.

Further, it is possible to make the film type resonance structure 10 itself transparent by selecting a transparent material such as a resin material as the material of the frame 18, the back plate 22, and the film-like member 16. For example, a transparent resin such as PET, acrylic, or polycarbonate need only be selected. Since a general porous sound absorbing material cannot prevent scattering of visible light, it is unique in that the transparent film type resonance structure can be realized.

Further, the frame 18, the back plate 22 and/or the film-like member 16 may be provided with a reflection prevention coating or a reflection prevention structure. For example, the reflection prevention coating using optical interference by a dielectric multilayer film can be provided. By preventing the reflection of visible light, the visibility of the frame 18, the back plate 22 and/or the film-like member 16 can be further lowered and made inconspicuous.

As described above, the transparent film type resonance structure can be attached to, for example, a window member, or used as an alternative.

Further, the frame 18, the back plate 22, or the film-like member 16 can have a heat shielding function. In a case in which it is a metal material, it generally reflects both near infrared rays and far infrared rays, so that radiation heat conduction can be suppressed. Further, even in a case in which it is a transparent resin material, it is possible to reflect only near infrared rays while keeping the material transparent by having a heat shield structure on the surface. For example, the dielectric multilayer structure can selectively reflect near infrared rays in a state of transmitting visible light. Specifically, since the multi-layer Nano series such as Nano 90s manufactured by 3M reflects near infrared rays with a layer structure of more than 200 layers, such a structure can be bonded to the transparent resin material to be used as the frame or the film-like member, and the member itself may be used as the film-like member 16. For example, as an alternative to the window member, a structure having the sound absorption property and the heat insulation property can be used.

In a system in which the environmental temperature is changed, it is desirable that both the frame material and the material of the film-like member 16 have a small change of physical properties with respect to the environmental temperature.

In the present invention, the film type resonance structure 10 is preferably disposed in the motor compartment 104. As described above, the temperature change inside the motor compartment 104 is large, and in a case in which the physical properties of the frame material and the material of the film-like member 16 are changed due to the temperature, there is a concern that the resonance frequency of the film vibration is changed, and a desired silencing effect cannot be obtained.

Therefore, for example, in a case in which the resin material is used, it is desirable to use the resin material of which a point (glass transition temperature, melting point, or the like) that causes a large change of physical properties is outside the environmental temperature range.

Further, in a case in which different members are used for the frame material and the film-like member, it is desirable that the thermal expansion coefficiency (linear thermal expansion coefficiency) at the environmental temperature is about the same.

In a case in which the thermal expansion coefficiency are different greatly between the frame material and the film-like member, the displacement amount of the frame, the back plate, and the film-like member are different in a case in which the environmental temperature is changed, so that the strain is likely to be generated in the film. Since the strain and tension changes affect the resonance frequency of the film, the silencing frequency tends to be changed with the temperature change, and there is a case in which even in a case in which the temperature returns to the original temperature, the strain is not relaxed and the silencing frequency is changed.

On the other hand, in a case in which the thermal expansion coefficiency is about the same, the frame, the back plate, and the film-like material expand and contract in the same manner with respect to the temperature change, so that strain is less likely to be generated, and as a result, it is possible to exhibit the stable silencing characteristic with respect to the change of environmental temperature.

The linear expansion coefficiency is known as an index of the thermal expansion coefficiency, and the linear expansion coefficiency can be measured by a known method such as JIS K 7197. The difference in the linear expansion coefficiency between the frame and the film-like material is preferably 9 ppm/K or less, more preferably 5 ppm/K or less, and particularly preferably 3 ppm/K or less in the used environmental temperature range. By selecting the member from such a range, the stable silencing characteristic can be exhibited at the used environmental temperature.

Further, the frame that supports the film-like member to allow vibration thereof need only support the film-like member to allow vibration thereof, and may be a part of the vehicle body of the electrified vehicle. As a result, the frame can be integrally formed in the vehicle body side in advance, and the film can be attached later.

Although various embodiments of the film type resonance structure of the present invention have been described in detail above, the present invention is not limited to these embodiments, and it is noted that various modifications or changes may be made without departing from the gist of the present invention.

EXAMPLES

Hereinafter, the present invention will be described in more detail with reference to Examples. The materials, usage amounts, proportion, processing contents, processing procedures, and the like shown in the following examples can be appropriately changed without departing from the spirit of the present invention. Therefore, the scope of the present invention should not be construed as being limited by the following examples.

Example 1

<Manufacturing of Film Type Resonance Structure>

An acrylic plate having a thickness of 3 mm (manufactured by Hikari Co., Ltd.) was prepared, and a frame having 6×11 opening portions of 20 mm×20 mm was manufactured. The processing was performed by using a laser cutter. The entire size was 300 mm×180 mm.

The acrylic plate having a thickness of 2 mm was processed into a size of 300 mm×180 mm as the back plate, and attached to one surface of the frame. The attachment was performed by using a double-sided tape (GENBA NO CHIKARA manufactured ASKUL corporation).

As the film-like member, a PET film (Lumirror manufactured by Toray Industries, Inc.) having a thickness of 50 μm was cut out to a size of 300 mm×180 mm. The film-like member was attached to the other surface of the frame with the double-sided tape.

As a result, a structure was obtained in which the film-like member having a thickness of 50 μm configured the film vibration portion having a size of 20 mm×20 mm, and 6×11 film type resonance structures having a back distance of 3 mm were arranged.

<Acoustic Tube Measurement>

Figure 25:
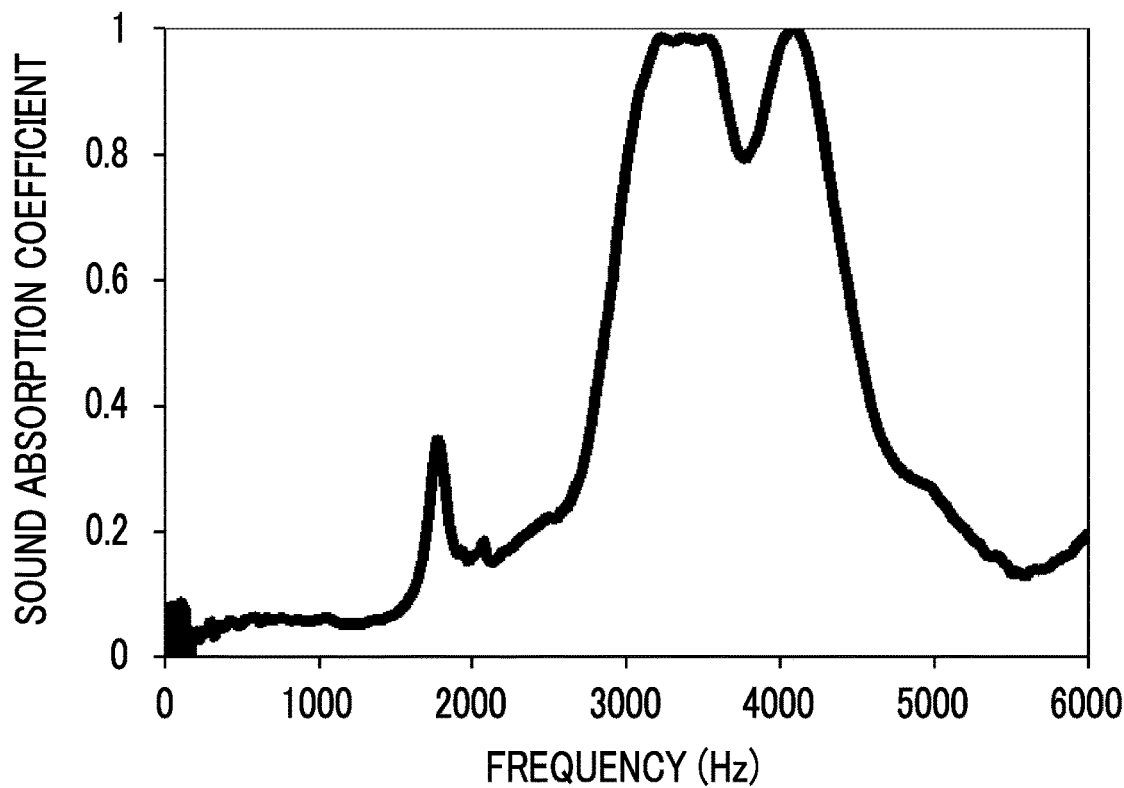
FIG. 25 is a graph showing the relationship between the frequency and the sound absorption coefficient.

The vertical incident sound absorption coefficient of the manufactured structure was measured. As the acoustic tube measurement, a measurement system for the vertical incident sound absorption coefficient according to JIS A 1405-2 was manufactured, and the evaluation was performed. The same measurement can be performed by using WinZac MTX manufactured by Nihon Onkyo Engineering Co., Ltd. The internal diameter of the acoustic tube was set to 2 cm, and the film surface of the film type resonance structure was disposed at the end portion of the acoustic tube as the acoustic incident surface side, and the vertical incident sound absorption coefficient was evaluated. FIG. 25 shows the results. It can be seen that the film type resonance structure has a large sound absorption coefficient of approximately 100% at 3 kHz and 4 kHz. In the film type resonance structure, a sound absorption in the vicinity of 1.7 kHz was the sound absorption coefficient of the fundamental vibration, and the film type resonance structure was designed such that the sound absorption coefficient of higher-order vibration is larger than the sound absorption coefficient of the fundamental vibration.

Further, based on FIG. 25, it can be seen that the film type resonance structure obtains a high sound absorption coefficient even in the frequency band between 3 kHz and 4 kHz, and can absorb the sound in a certain bandwidth while absorbing the sound in the specific frequency band.

<Evaluation>

The manufactured film type resonance structure was incorporated into the electrified vehicle, and the silencing volume was evaluated as follows.

The LEAF (2017 model) manufactured by Nissan Motor Corporation was used as the electrified vehicle. In the motor compartment of the LEAF, the motor is positioned near the bottom of the center, and the inverter is stacked thereon. It is known that both the motor and the inverter generate a plurality of strong single frequency sound components in the high frequency band of 1 kHz or more by actual vehicle traveling. In the LEAF, as in the general vehicle, an open portion is present in the bottom of the motor compartment, and a hole portion that performs ventilation from the motor compartment to the vehicle cabin, and an open portion in which the hood side portion is filled with foam urethane are present. The purpose of this experiment is to show that the noise of the specific sound can be suppressed in a situation in which there are a plurality of paths for the sound transmission path from the motor compartment to the vehicle cabin, such as the electrified vehicle with such a complicated shape. In the plurality of paths described above, a path in which the sound is transmitted by causing the dash insulator to vibrate, a path in which the sound comes out of the motor compartment and then enters the vehicle cabin again, a path in which the sound is transmitted directly from the motor compartment to the vehicle cabin through the hole portion as the air propagation sound.

In the experiment, the evaluation was performed in an environment in which the electrified vehicle was disposed in an anechoic chamber and the acoustic echo was not present, and under a condition in which the background noise was sufficiently low. The measurement was performed by using the anechoic chamber manufactured by the Nihon Onkyo Engineering Co., Ltd.

Two manufactured film type resonance structures in the motor compartment of the electrified vehicle were attached to the hood. The position of the film type resonance structure was the position in which the sound absorbing material of the LEAF (felt-based porous sound absorbing body, the thickness is about 30 mm at maximum) was attached, and this sound-absorbing material was removed and the film type resonance structure was disposed instead.

As the sound source, in order to simulate the peak sounds of the inverter and the motor, the waveguide was formed with a hose, and the end portion of a so-called hose sound source (manufactured by Nihon Onkyo Engineering Co., Ltd.), which draws in the sound of the speaker (speaker manufactured by Anker), was fixed to the inverter cover side portion. YAMAHA 2500S was used as the power amplifier for the speaker, and the white noise was generated by the noise generator of the software manufactured by Nihon Onkyo Engineering Co., Ltd.

The used microphone was MI-1431 manufactured by ONO SOKKI CO., LTD. The measurement was performed in the vicinity of the sound source by disposing and fixing three microphone in the inverter cover side, one microphone outside the vehicle cabin, and three microphones to the driver's ear position of the vehicle cabin. The reason for disposing a plurality of microphones is that the location dependency may be large due to the small wavelength size, particularly for high frequency sound. The following results show the results of averaging the microphone data at the ear position in the vehicle cabin.

The analysis was performed simultaneously on both the ⅓ octave band (frequency weighting FLAT) and the narrow band spectrum.

First, as a reference, in a state in which the film type resonance structure is not disposed, a white noise was generated from the speaker, and the sound pressure was measured at the ear position in the vehicle cabin. In a case of the measurement, the experiment was carried out with both the hood and the door of the vehicle cabin closed.

Figure 26:
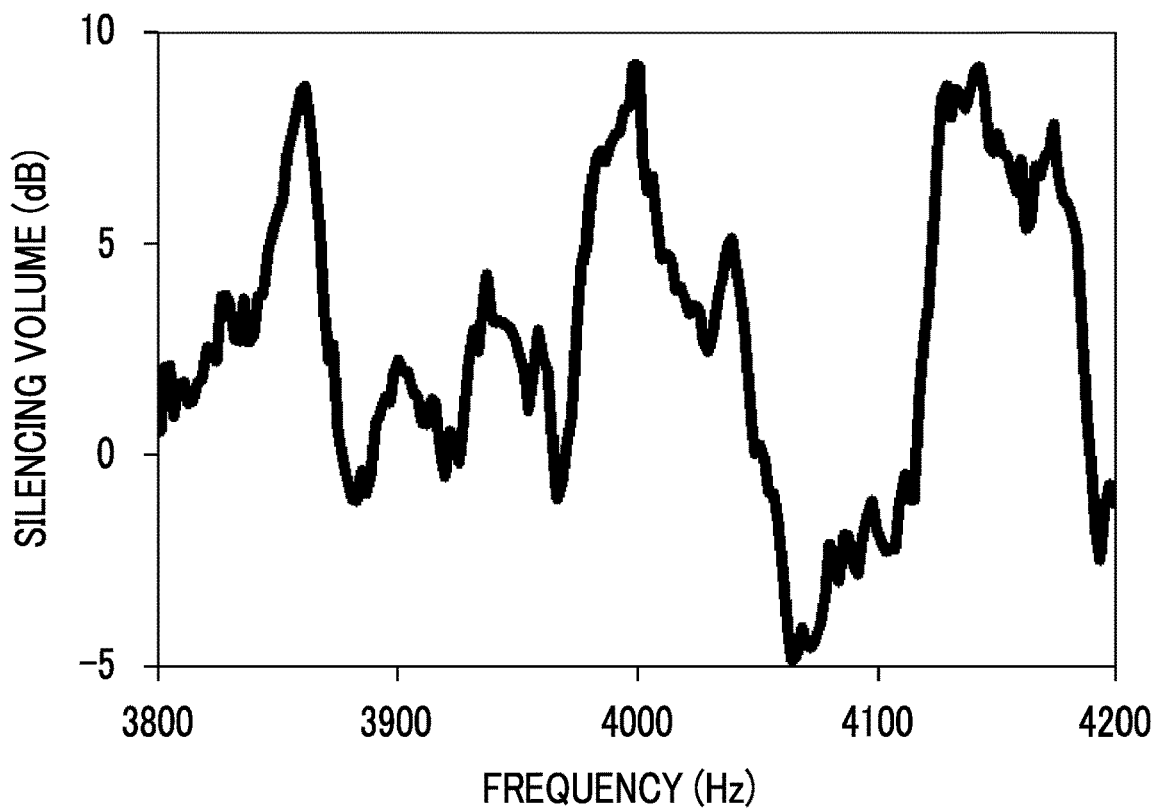
FIG. 26 is a graph showing the relationship between the frequency and a silencing volume.

Next, in a state in which the film type resonance structure is disposed, a white noise was generated from the speaker, and the sound pressure was measured at the ear position in the vehicle cabin. The difference from the reference sound pressure measurement result was calculated as the silencing volume. FIG. 26 shows the results.

Based on FIG. 26, it can be seen that a silencing volume of 9 dB or more was obtained in the vicinity of 4 kHz at which the film type resonance structure has resonance. It can be seen that the back surface thickness of this film type resonance structure is 3 mm and the wavelength of 4 kHz is 86 mm, so that a large silencing effect can be obtained with a thickness of only 3.5% of the wavelength.

Comparative Example 1

In Comparative Example 1, instead of the film type resonance structure, the Thinsulate (PPS-200) manufactured by 3M, which is often used as a soundproof material for vehicles, was used. The thickness of the Thinsulate was 13 mm. The back plate was attached to the back of the Thinsulate. The back plate was manufactured by processing the acrylic plate in the same manner as the back plate of Example 1. The soundproof material was processed to the same area as in Example 1 with a laser cutter. The processed soundproof material was attached at the same position as in Example 1, and the same measurement as above was performed.

Comparative Example 2

As Comparative Example 2, a felt-based soundproof material originally attached to the LEAF was used. The same measurement as in Example 1 was performed in the original attachment state. The thickness of the felt-based soundproof material itself is about 30 mm at maximum, and it was attached in the manner such that a space is created on the back surface.

Figure 27:
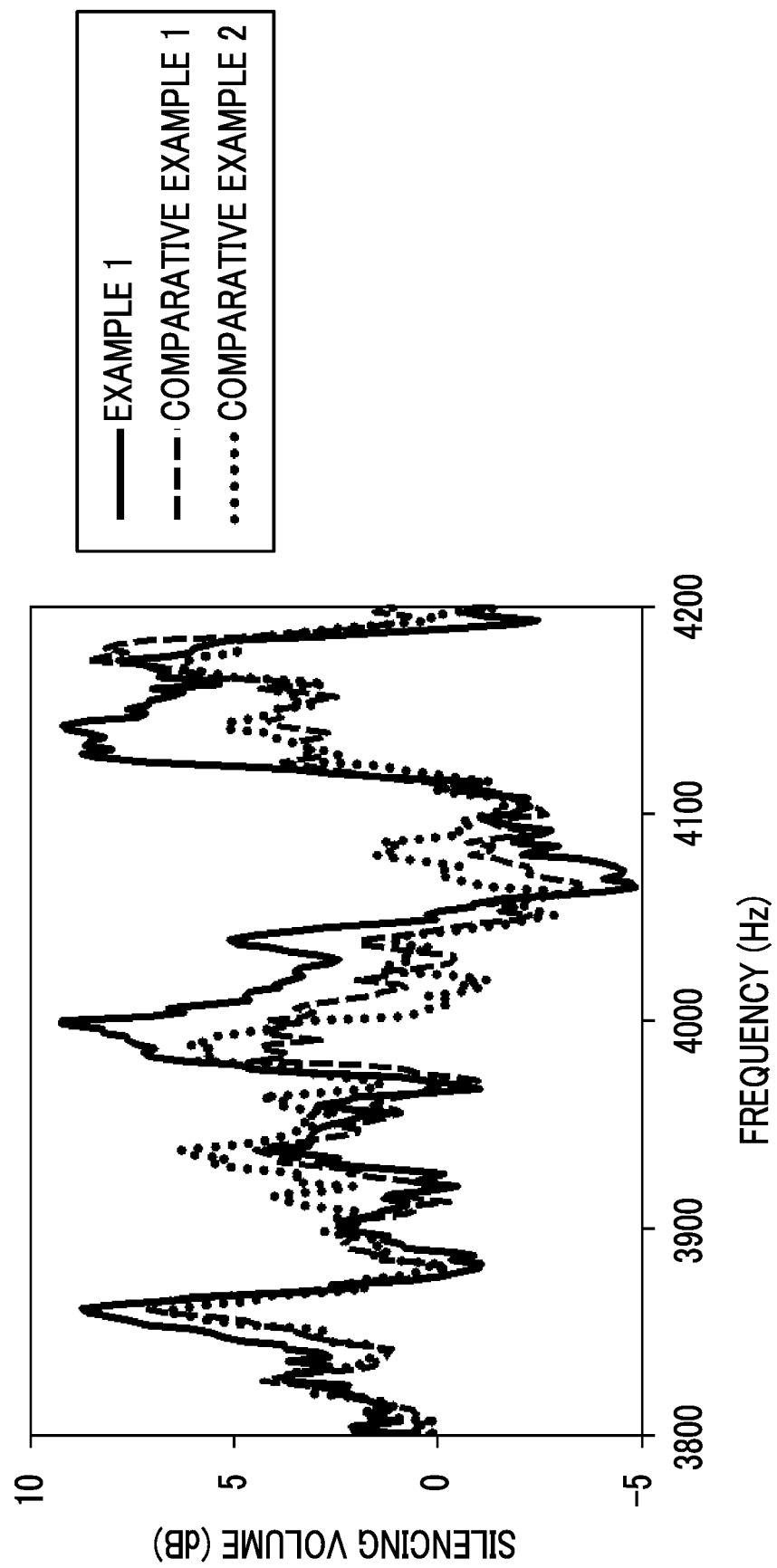
FIG. 27 is a graph showing the relationship between the frequency and the silencing volume.

FIG. 27 shows the measurement results of Comparative Example 1 and Comparative Example 2. Also, FIG. 27 shows the results of Example 1. It can be seen that the thinnest film type resonance structure of Example 1 could obtain a high silencing volume at a silencing peak of 4 kHz. Further, Table 1 shows the evaluation results in the ⅓ octave band. It can be seen that the silencing volume of Example 1 also was higher than the silencing volume of Comparative Examples 1 and 2 in the ⅓ octave band evaluation.

TABLE 1

| | Type | Thickness (mm) | Silencing peak in vicinity of 4 kHz (dB) | ⅓ Octave band silencing volume (around 3.15 kHz) (dB) |
|---|---|---|---|---|
| Example 1 | Film type resonance structure | 3 | 9.22 | 3.05 |
| Comparative Example 1 | Thinsulate | 13 | 4.58 | 2 |
| Comparative Example 2 | Original porous sound absorbing body | 30 | 6.1 | 2.27 |

Figure 28:
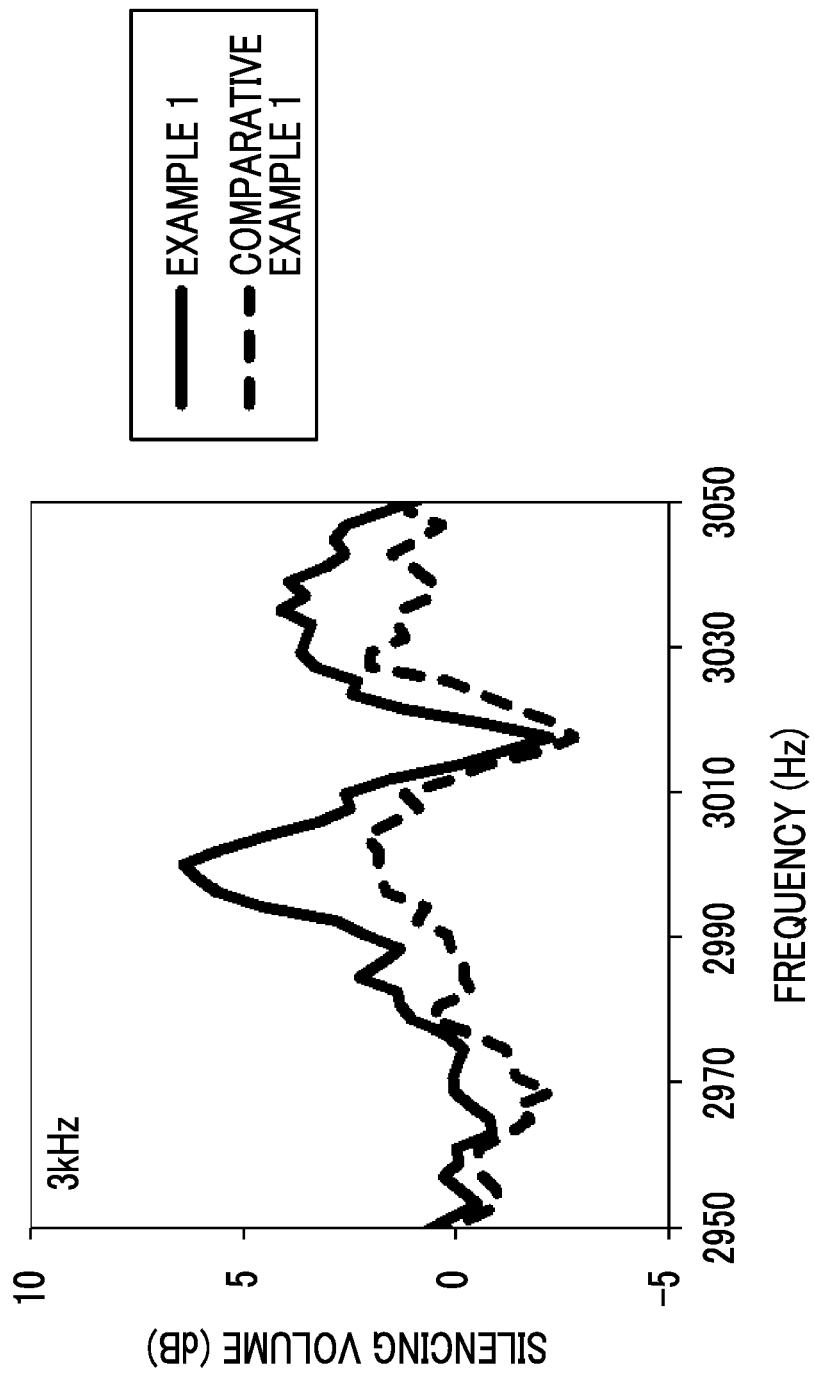
FIG. 28 is a graph showing the relationship between the frequency and the silencing volume.

FIG. 28 shows the results of comparing the silencing volume in the vicinity of 3 kHz between Example 1 and Comparative Example 1. As shown in FIG. 25, the film type resonance structure included in the silencing member for the electrified vehicle according to the embodiment of the present invention has different film vibration modes in a plurality of frequency regions, and each of the film vibration modes exhibits high sound absorption. As shown in FIG. 28, the silencing volume of Example 1 with respect to the sound absorption at 3 kHz, which is in a mode different from 4 kHz, was greatly higher than the silencing volume of the thicker Thinsulate (Comparative Example 1). As described above, the film type resonance structure included in the silencing member for the electrified vehicle according to the embodiment of the present invention can simultaneously silence peak sounds of a plurality of the frequencies depending on the film vibration resonance of a plurality of orders.

As described above, it can be seen that the silencing member for the electrified vehicle according to the embodiment of the present invention is thinner and has a higher silencing effect as compared with the porous sound absorbing body in the related art. In particular, it can be seen that the thickness is 1/10 of the sound absorbing body of the electrified vehicle currently on the market and a high silencing effect is obtained, and the structure is excellent for silencing of the peak sound.

Example 2

The film type resonance structure was manufactured in the same manner as in Example 1 except that the thickness of the back space (that is, the thickness of the acrylic plate) was 5 mm, the size of the opening portion of the frame was 30 mm×30 mm, the thickness of the film-like member (PET film) was 100 μm, and 4×8 film type resonance structures were arranged, and the silencing volume was measured in the same manner as in Example 1.

The film type resonance structure of Example 2 has the sound absorption peak in the vicinity of 2 kHz.

Figure 29:
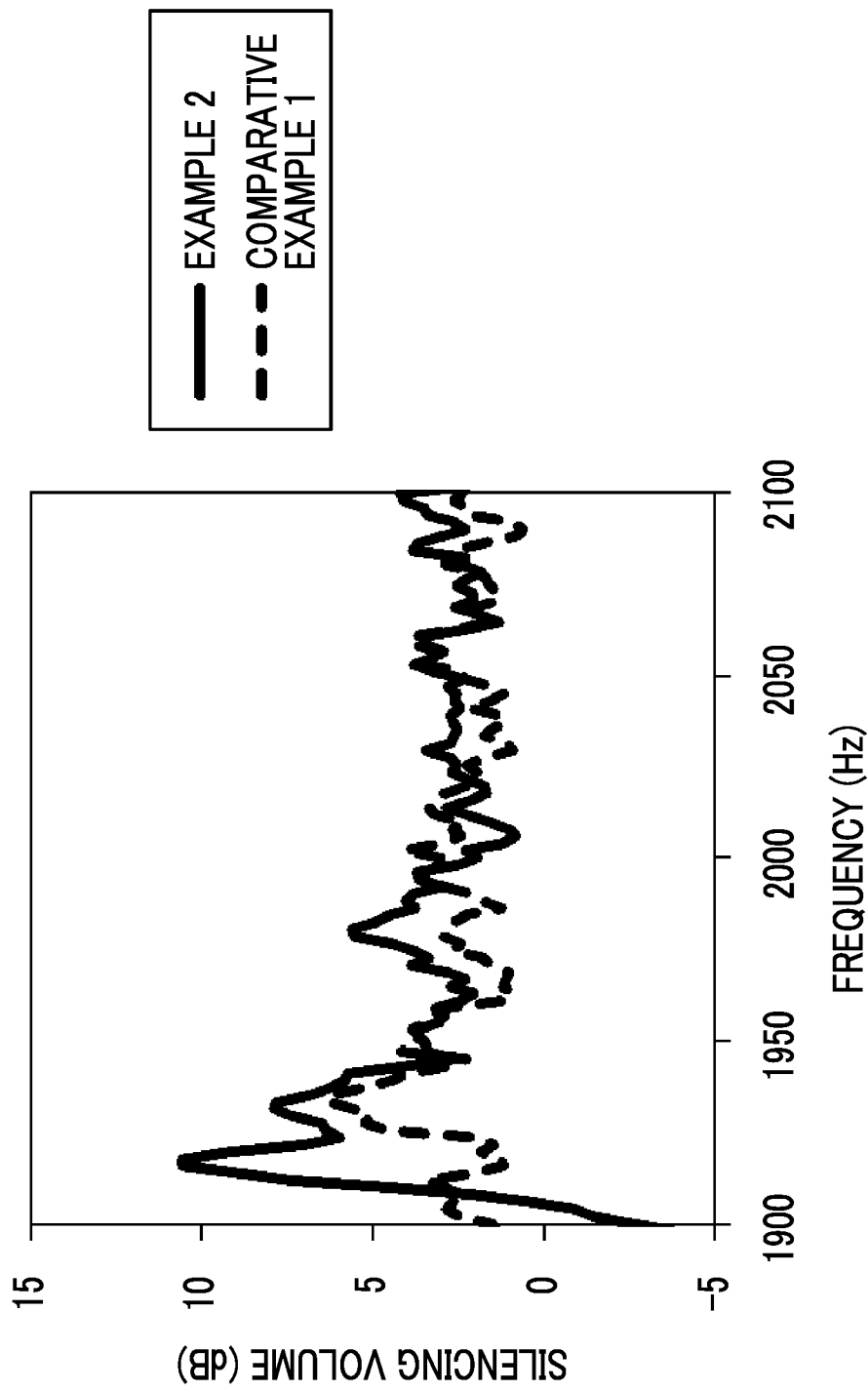
FIG. 29 is a graph showing the relationship between the frequency and the silencing volume.

FIG. 29 shows the results.

Based on FIG. 29, it can be seen that in Example 2, the silencing volume is larger than that in Comparative Example 1, and a maximum silencing volume of 10.5 dB can be obtained.

Example 3

The film type resonance structure was manufactured in the same manner as in Example 1 except that the thickness of the back space (that is, the thickness of the acrylic plate) was 2 mm, and 6×11 film type resonance structures were arranged, and the silencing volume was measured in the same manner as in Example 1.

The film type resonance structure of Example 3 has the sound absorption peak in the vicinity of 4.5 kHz.

Figure 30:
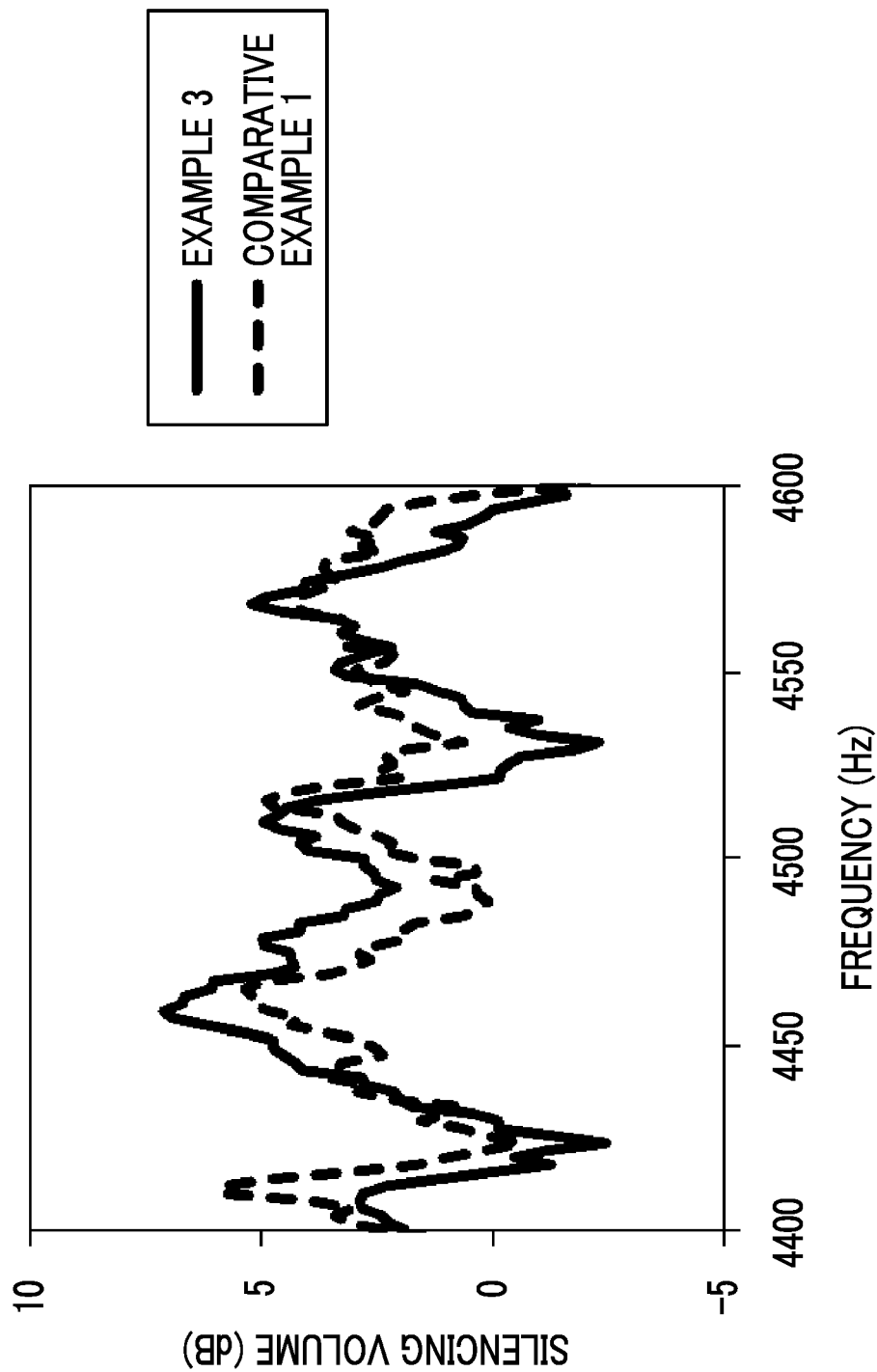
FIG. 30 is a graph showing the relationship between the frequency and the silencing volume.

FIG. 30 shows the results.

Based on FIG. 30, it can be seen that in Example 3, the silencing volume is larger than that in Comparative Example 1.

Comparative Example 3

As described above, a Helmholtz resonance structure is known as a structure for silencing the narrow band sound, and an attempt to use the structure in the vehicles has been made as described in the prior literature. Therefore, as Comparative Example 3, the Helmholtz resonance structure was manufactured, and the same evaluation as in Example 1 was performed.

The target frequency was 4 kHz.

The surface plate was the acrylic plate which has a thickness of 3 mm and has a through hole having a diameter of 6 mm. An intermediate frame has an acrylic frame structure having a thickness of 3 mm and a frame size of 20 mm. The back plate was the acrylic plate having a thickness of 2 mm. That is, the Helmholtz resonance structure having the internal space of 20 mm×20 mm×3 mm, and the opening portion having a diameter of 6 mm and a length of 3 mm was obtained. The arrangement was 6×11 as in Example 1.

In the Helmholtz resonance structure, the thickness of the surface plate also contributes mainly to sound absorption, and thus it cannot be reduced, and the total thickness is 6 mm excluding the back plate. On the other hand, a thin film can be used in the film type resonance structure of Example 1, and the total thickness is 3.05 mm excluding the back plate. This is an essential difference due to the resonance characteristics, and for the same target frequency, the film type resonance structure can be weight-reduced, miniaturized, and thinned as compared with the Helmholtz resonance.

Figure 31:
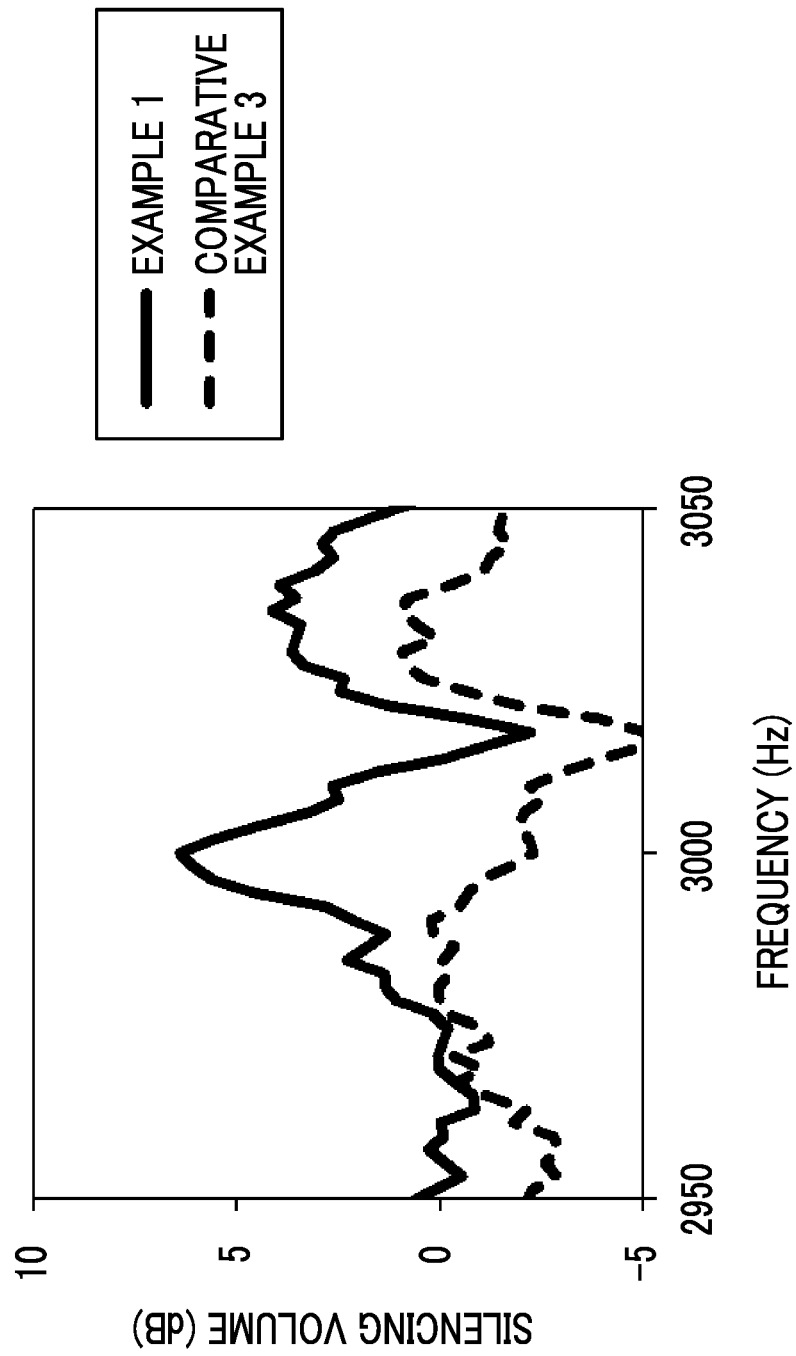
FIG. 31 is a graph showing the relationship between the frequency and the silencing volume.
Figure 32:
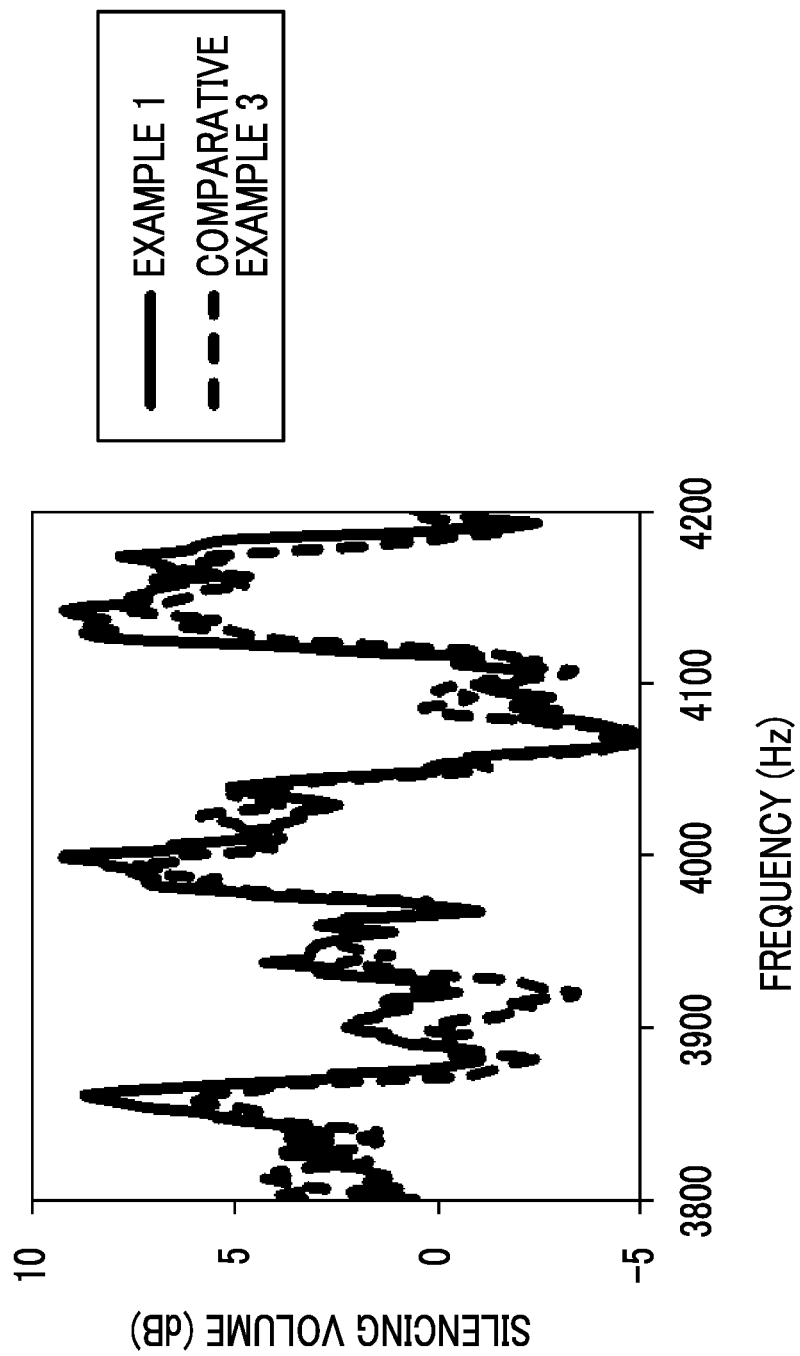
FIG. 32 is a graph showing the relationship between the frequency and the silencing volume.

This Helmholtz resonance structure was incorporated into the electrified vehicle in the same manner as in Example 1, and the silencing volume was measured. FIGS. 31 and 32 show the results.

Based on FIG. 32, it can be seen that there is almost no change in silencing volume between Example 1 and Comparative Example 3 in the vicinity of 4 kHz in which the structures of both Example 1 and Comparative Example 3 resonate. That is, it can be seen that the film type resonance structure can exhibit the same silencing effect with about half the volume of the Helmholtz resonance structure.

Further, based on FIG. 31, in the vicinity of 3 kHz, Example 1 has a silencing effect due to another vibration order, but Comparative Example 1 cannot have resonance in a plurality of frequency bands, and has no silencing effect.

As described above, it can be seen that the film type resonance structure of the silencing member for the electrified vehicle according to the embodiment of the present invention is superior to the Helmholtz resonance structure in that the silencing member is lightweight, thin, and capable of silencing a plurality of the frequencies.

<Evaluation of Influence of Wind Noise>

The following experiment was carried out to confirm the effect of the wind noise as a comparison between the film type resonance structure and the Helmholtz resonator.

A DC axial fan (San Ace 60, Model: 9GA0612P1J03, manufactured by SANYO DENKI CO., LTD.) was prepared, and the fan was attached to one end surface of a duct (opening cross section 60 mm×60 mm, length 145 mm). The microphone (manufactured by ACO Co., Ltd.) was disposed at the other end portion of the duct, the volume was measured for a state in which there is no device (reference example), a state in which a part of the wall surface is the film type resonance structure (Example 4), and a state in which a part of the wall surface is the Helmholtz resonator (Comparative Example 4), and the comparing was performed. Here, the resonance frequencies of the film type resonance structure and the Helmholtz resonator were adjusted to 1.5 kHz. In the film type resonance structure, it was the resonance frequency in the second vibration mode.

In the film type resonance structure, the film-like member was the polyethylene terephthalate (PET) film having a thickness of 125 μm, the frame had the opening portion of Φ26 mm, and the back distance (thickness) was 5 mm.

The Helmholtz resonator was designed to have the same volume as the film type resonance structure. That is, the thickness of the surface plate was 2 mm, the back distance was 3 mm, the back space was a columnar cavity of Φ26 mm, and the through hole (resonance hole) having a hole diameter of 2.5 mm and a thickness of 2 mm was formed in the surface plate.

Moreover, both the film type resonance structure and the Helmholtz resonator were attached to the side surface on one end surface side of the duct.

The amount of current applied to the fan was adjusted such that the peak sound of the fan matched 1.5 kHz. The peak sound of the fan is a phenomenon in which the fundamental frequency is decided by (the number of fan blades×the rotation speed), and a strong sound is emitted at a frequency that is an integral multiple of that frequency. The wind speed measured at the end portion of the duct was 10 m/s.

A relationship between frequency and volume was measured in this state.

Figure 33:
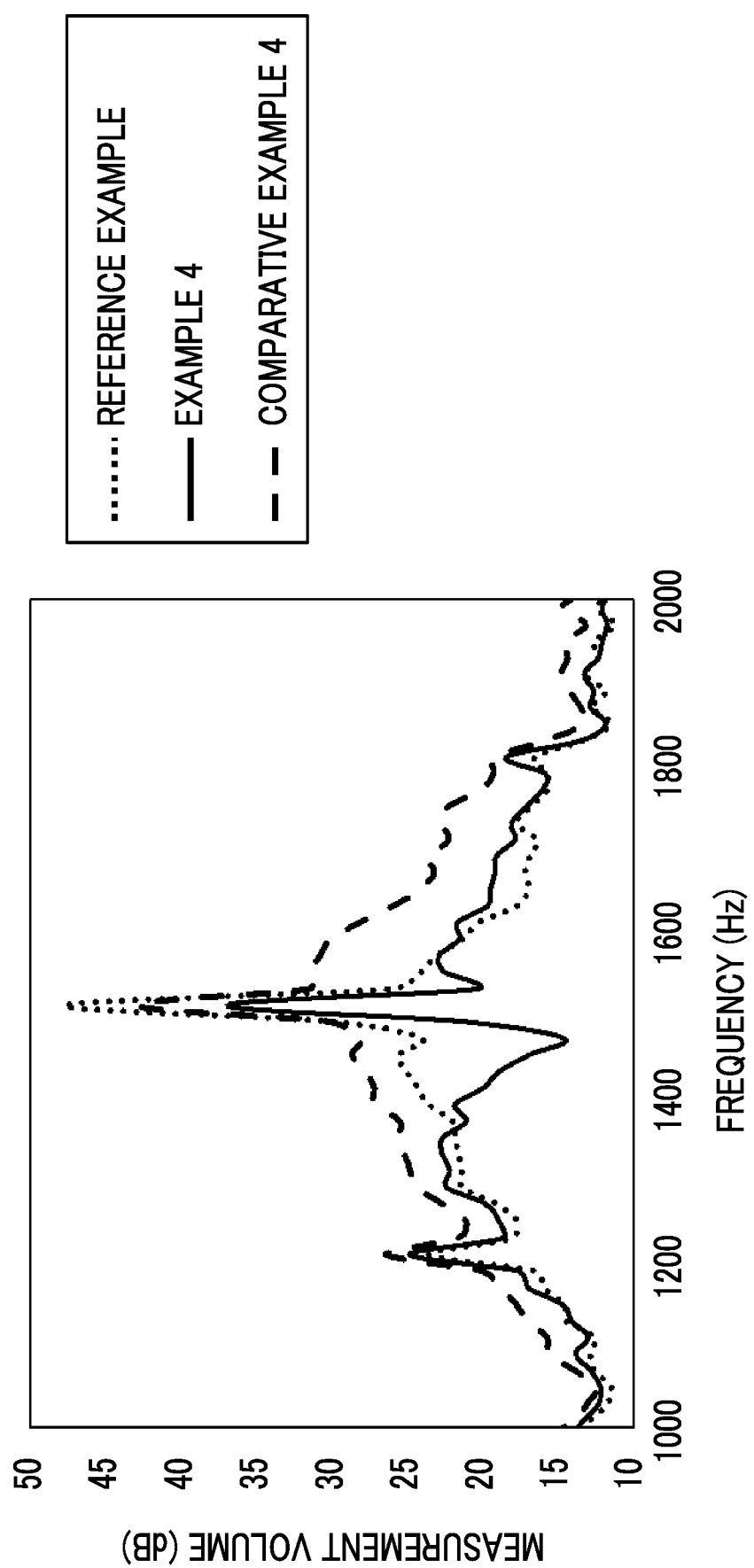
FIG. 33 is a graph showing the relationship between the frequency and a measurement volume.

FIG. 33 shows the results. In the graph shown in FIG. 33, the frequency axis on the horizontal axis was averaged every 20 Hz for noise removal.

Based on FIG. 33, first, paying attention to the peak frequency, the film type resonance structure performs peak silencing of 10 dB or more. By comparison, the silencing volume of the Helmholtz resonator is about 5 dB, and the silencing width is small. Further, at its peripheral frequency, the film type resonator silences the sound in a range of about 1.4 kHz to 1.6 kHz, and at other frequencies, there is not much change from the original. This is because the band of the film type resonator is wider than the band of the peak sound of the fan. In addition, it can be seen that amplification due to the wind noise did not occur especially.

On the other hand, in the case of the Helmholtz resonator, the volume is amplified more than the original sound over the entire band of 1 kHz width in the vicinity of the peak frequency. This is the amplification of the wind noise. Amplification of 5 dB or more at maximum was observed, and there was a large change in audibility. At the opening portion of the Helmholtz resonator, the wind first generates a white noise-like wind noise over the wide frequency spectrum. In the wind noise, the sound in the vicinity of the resonance frequency of the Helmholtz resonator is amplified and radiated again by the Helmholtz resonator. As a result, a loud wind noise is generated in the vicinity of the resonance peak.

As described above, it can be seen that in the Helmholtz resonator, a large wind noise is generated around the resonance frequency in a case in which there is wind, while the film type resonance structure has an advantage that no wind noise is generated. Therefore, it can be seen that in a case in which the resonator is used for silencing in a case in which there is fan wind or wind due to the electrified vehicle traveling, by using the film type resonance structure, it is possible to silence the sound of the desired peak frequency without generating a loud wind noise.

Example 5

In Example 5, a case in which the porous sound absorbing body having a wide band silencing characteristic and the film type resonance structure having a strong silencing effect on peak sound were combined was examined.

The silencing member for the electrified vehicle was manufactured in the same manner as in Example 1 except that the Thinsulate (PPS-200) used in Comparative Example 1 was stacked on the film surface of the film type resonance structure, and the same evaluation as in Example 1 was performed. In this case, the Thinsulate was adhered only to the outer frame of the film type resonance structure with a tape such that the Thinsulate did not suppress the film vibration.

Figure 34:
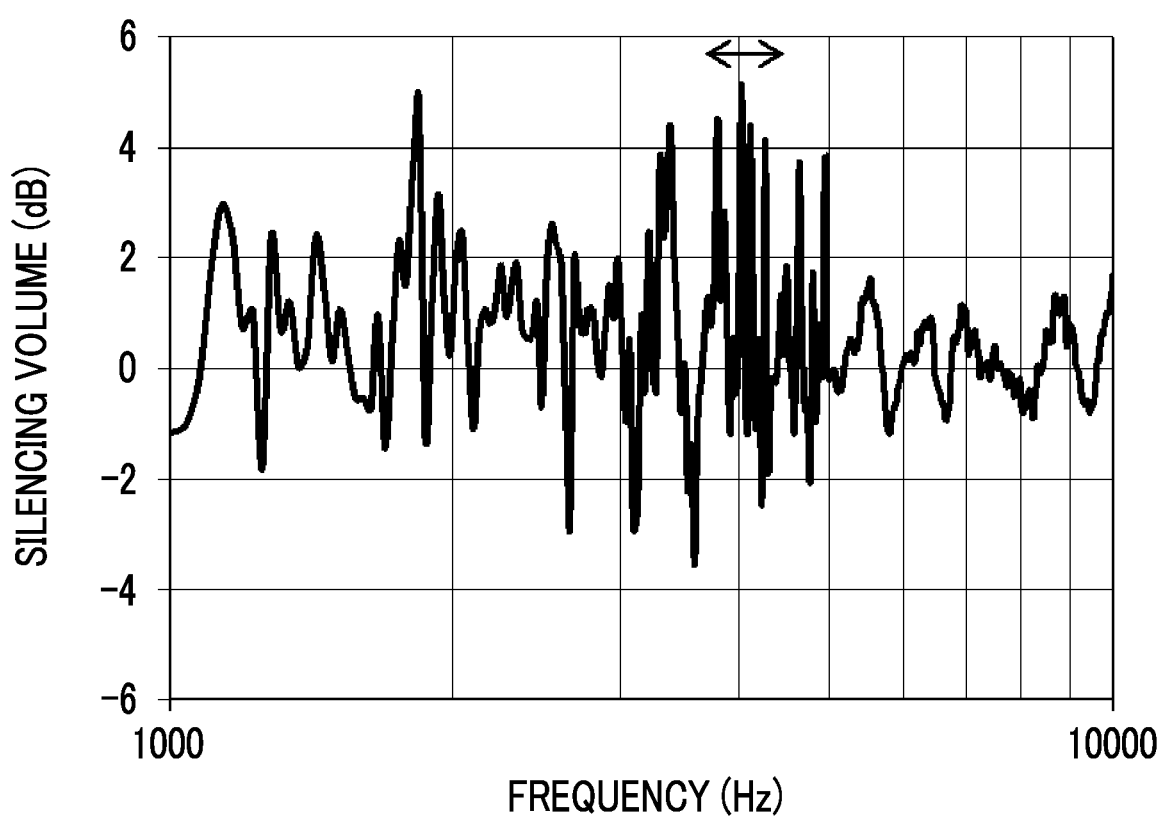
FIG. 34 is a graph showing the relationship between the frequency and the silencing volume.

FIG. 34 shows the results. The silencing volume shown in FIG. 34 was obtained by using the reference as Comparative Example 1 (configuration in which the Thinsulate was disposed).

The range indicated by the arrow in FIG. 34 is in the vicinity of the maximum value of sound absorption of the higher-order vibration of the film type resonance structure. In this range, it can be seen that a strong silencing effect due to the resonance of the film type resonance structure appeared. Furthermore, paying attention to the higher frequency side, it can be seen that the high sound absorption in the wide band on the high frequency side of the Thinsulate was maintained even in the structure, and the wide band sound absorption was exhibited. That is, it can be seen that both the silencing of the peak sound due to the resonance of the film type resonance structure and the wide band sound absorption of the porous sound absorbing body were achieved. Further, focusing on the lower frequency side, it can be seen that the silencing volume of Example 4 was higher than that of the Thinsulate by itself even on the low frequency side.

As described above, it can be seen that by stacking the film type resonance structure and the porous sound absorbing body, the peak silencing and the wide band silencing can be realized over the entire range.

From the above description, the effect of the present invention is clear.

EXPLANATION OF REFERENCES

10: film type resonance structure
16, 16a to 16f: film-like member
17: through hole
18, 30a to 30d: frame
19: opening surface
20: opening portion
22: back plate
24, 24a to 24c: back space
26, 26a, 26b: porous sound absorbing body
50: silencing member for electrified vehicle
100: electrified vehicle
102: electrified vehicle motor
104: motor compartment
106: hood
108: vehicle cabin
110: tire
112: inverter
114: spacer

What is claimed is:

1. A silencing member for an electrified vehicle, the silencing member comprising a film type resonance structure which silences a sound generated from a sound source which is disposed in an electrified vehicle,
wherein the sound source generates a narrow band sound,
the film type resonance structure is disposed in the same space as the sound source or in a vehicle cabin of the electrified vehicle,
the film type resonance structure includes at least one film-like member, a frame which supports the film-like member to allow vibration thereof, and a back plate which is installed in the frame to face the film-like member, the film-like member, the frame, and the back plate form a back space surrounded by the film-like member, the frame, and the back plate, the sound generated from the sound source is silenced by film vibration due to the film-like member of the film type resonance structure, a sound absorption coefficient of film vibration of the film-like member at a frequency in a third or higher order vibration mode is higher than a sound absorption coefficient at a frequency in a fundamental vibration mode, the sound absorption coefficient is 20% or more over an entire frequency band between adjacent high-order vibration modes, and a hardness of the film-like member, $E \times t^3$ (Pa·m$^3$), is equal to or less than $21.6 \times d^{-1.25} \times \Phi^{4.15}$, where:
E represents a Young's modulus of the film-like member;
t represents a thickness of the film-like member,
d represents a thickness of the back space; and
Φ represents a circle equivalent diameter of the region in which the film-like member vibrates.

2. The silencing member for an electrified vehicle according to claim 1, wherein the film type resonance structure is disposed in the same space as the sound source.

3. The silencing member for an electrified vehicle according to claim 1, wherein the sound source is at least one of an electrified vehicle motor, an inverter and a converter for the electrified vehicle motor, or an inverter and a converter for an electrified vehicle battery that supplies an electric power to the electrified vehicle motor.

4. The silencing member for an electrified vehicle according to claim 3,
wherein the electrified vehicle includes a motor compartment which forms a space in which the electrified vehicle motor is disposed, and
the film type resonance structure is disposed in the motor compartment.

5. The silencing member for an electrified vehicle according to claim 1, wherein a through hole is formed in at least one of the film-like member or the frame.

6. The silencing member for an electrified vehicle according to claim 1, wherein in a case in which a wavelength of a peak frequency of the narrow band sound generated by the sound source is λ, a thickness of the back space is λ/6 or less in a direction perpendicular to a surface of the film-like member.

7. The silencing member for an electrified vehicle according to claim 1, wherein a peak frequency of the narrow band sound generated by the sound source is 1000 Hz or more.

8. The silencing member for an electrified vehicle according to claim 1, further comprising a porous sound absorbing body which is attached to the film type resonance structure.

9. The silencing member for an electrified vehicle according to claim 1, wherein the film type resonance structure is attached to a hood of the electrified vehicle.

10. The silencing member for an electrified vehicle according to claim 3, wherein the film type resonance structure is attached to at least one of a cover of the electrified vehicle motor of the electrified vehicle or a cover of the inverter for the electrified vehicle motor.

11. The silencing member for an electrified vehicle according to claim 1, wherein at least one of the frame or the back plate is integrally formed with a component of the electrified vehicle.

12. The silencing member for an electrified vehicle according to claim 11, wherein the back plate is a hood of the electrified vehicle.

13. The silencing member for an electrified vehicle according to claim 11, wherein the frame is integrally formed with a hood of the electrified vehicle.

14. The silencing member for an electrified vehicle according to claim 1, wherein an average thickness of the film type resonance structure is 10 mm or less.

15. The silencing member for an electrified vehicle according to claim 2, wherein the sound source is at least one of an electrified vehicle motor, an inverter and a converter for the electrified vehicle motor, or an inverter and a converter for an electrified vehicle battery that supplies an electric power to the electrified vehicle motor.

16. The silencing member for an electrified vehicle according to claim 15,
wherein the electrified vehicle includes a motor compartment which forms a space in which the electrified vehicle motor is disposed, and
the film type resonance structure is disposed in the motor compartment.

17. The silencing member for an electrified vehicle according to claim 2, wherein a through hole is formed in at least one of the film-like member or the frame.

18. The silencing member for an electrified vehicle according to claim 2, wherein in a case in which a wavelength of a peak frequency of the narrow band sound generated by the sound source is λ, a thickness of the back space is λ/6 or less in a direction perpendicular to a surface of the film-like member.

19. The silencing member for an electrified vehicle according to claim 1, wherein the thickness of the back space is 5 mm or less.

20. The silencing member for an electrified vehicle according to claim 1, wherein the thickness of the back space is 2 mm or less.

21. The silencing member for an electrified vehicle according to claim 1, wherein the hardness of the film-like member, $E \times t^3$ (Pa·m$^3$), is equal to or less than $11.1 \times d^{-1.25} \times \Phi^{4.15}$.

22. The silencing member for an electrified vehicle according to claim 1, wherein a frequency of a second order vibration mode of the film-like member is 1 kHz or more.

* * * * *